(12) United States Patent
Keller et al.

(10) Patent No.: US 11,084,031 B1
(45) Date of Patent: Aug. 10, 2021

(54) METHODS OF FABRICATING MICROFLUIDIC VALVES AND SYSTEMS

(71) Applicant: Facebook Technologies, LLC, Menlo Park, CA (US)

(72) Inventors: Sean Jason Keller, Bellevue, WA (US); Nicholas Roy Corson, Seattle, WA (US); Yigit Mengue, Kirkland, WA (US); Serol Turkyilmaz, Redmond, WA (US); Robert Manson, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 290 days.

(21) Appl. No.: 16/279,152

(22) Filed: Feb. 19, 2019

(51) Int. Cl.
*B01L 3/00* (2006.01)
*G02B 27/00* (2006.01)
(Continued)

(52) U.S. Cl.
CPC ... *B01L 3/502707* (2013.01); *B01L 3/502715* (2013.01); *B01L 3/502738* (2013.01);
(Continued)

(58) Field of Classification Search
CPC .... B01L 3/00; B01L 3/50; B01L 3/502; B01L 3/5027; B01L 3/5027; B01L 3/502707; B01L 3/50271; B01L 3/502715; B01L 3/50273; B01L 3/502738; G02B 27/00; G02B 27/01; G02B 27/017; G02B 27/0176; G06F 3/00; G06F 3/01; G06F 3/011
See application file for complete search history.

(56) References Cited

U.S. PATENT DOCUMENTS 6,068,751 A 5/2000 Neukermans
6,561,224 B1 5/2003 Cho
(Continued)

FOREIGN PATENT DOCUMENTS

WO 91/02169 A1 2/1991
WO 2014/100732 A1 6/2014

OTHER PUBLICATIONS

International Search Report and Written Opinion received for PCT Application Serial No. PCT/US2020/018023 dated Jun. 4, 2020, 16 pages.
(Continued)

*Primary Examiner* — Jacob T Minskey
*Assistant Examiner* — Matthew Hoover
(74) *Attorney, Agent, or Firm* — FisherBroyles, LLP

(57) ABSTRACT

The disclosed microfluidic valves may include a valve body having at least one cavity therein, a gate transmission element separating the cavity into an input gate terminal and an output gate terminal, a gate port configured to convey drive fluid into the input gate terminal, and a fluid channel. The gate transmission element may include a flexible membrane and a plunger coupled to the flexible membrane. The gate transmission element may be configured to move within the cavity to inhibit a subject fluid flow from an inlet port to an outlet port of the fluid channel upon pressurization of the input gate terminal, and to allow subject fluid flow from the inlet port to the outlet port upon depressurization of the input gate terminal. Various other related systems and methods are also disclosed.

11 Claims, 25 Drawing Sheets

(51) Int. Cl.
*G06F 3/00* (2006.01)
*G06F 3/01* (2006.01)
*G02B 27/01* (2006.01)

(52) U.S. Cl.
CPC .......... *G02B 27/0176* (2013.01); *G06F 3/011* (2013.01); *G02B 2027/0178* (2013.01)

(56) References Cited

U.S. PATENT DOCUMENTS

| | | | |
|---|---|---|---|
| 6,748,975 | B2 | 6/2004 | Hartshorne et al. |
| 7,607,641 | B1 | 10/2009 | Yuan |
| 2002/0124897 | A1* | 9/2002 | Bergh ................ F16K 99/0059 137/885 |
| 2009/0095363 | A1* | 4/2009 | Nakakubo ........... F16K 99/0059 137/843 |
| 2010/0233037 | A1* | 9/2010 | Melin ............... B01L 3/502738 422/537 |

OTHER PUBLICATIONS

Mohan et al., "Design considerations for elastomeric normally closed microfluidic valves", ScienceDirect, Sensors and Actuators B: Chemical, vol. 160, No. 1, Sep. 17, 2011, pp. 1216-1223.

\* cited by examiner

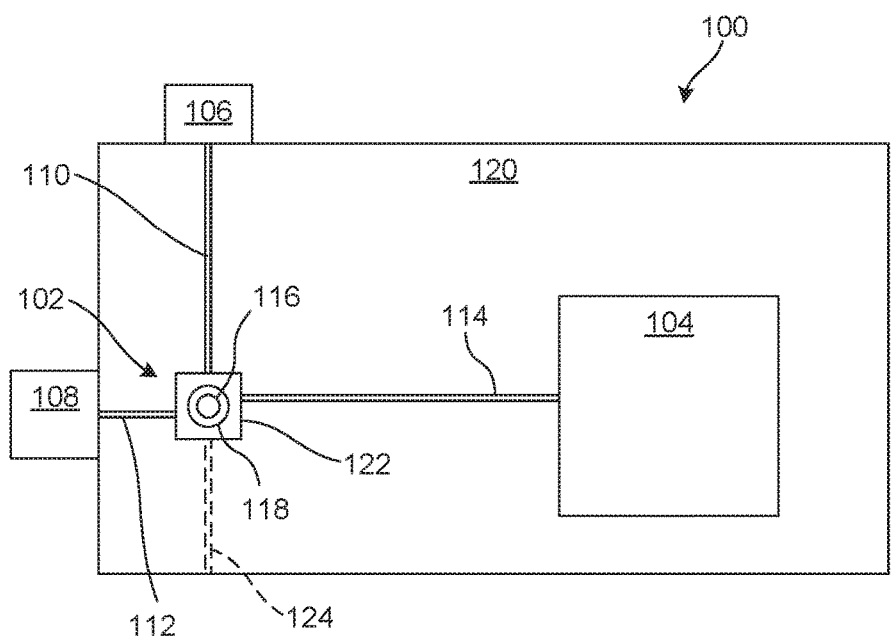
FIG. 2
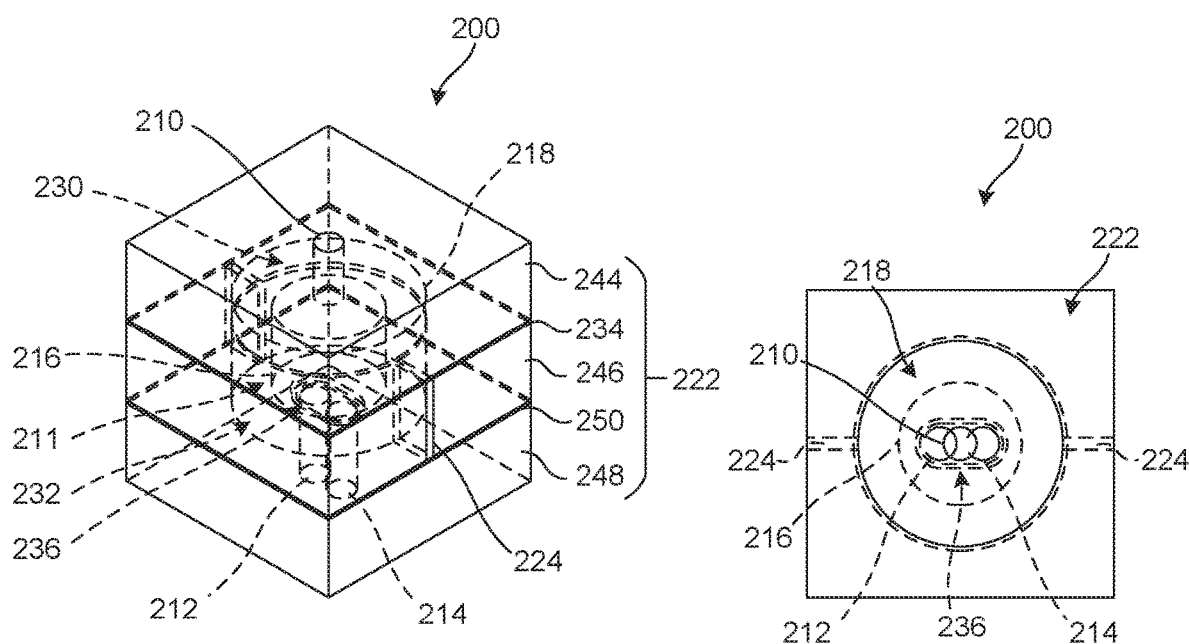
FIG. 3A  FIG. 3B

METHODS OF FABRICATING MICROFLUIDIC VALVES AND SYSTEMS

BACKGROUND

Microfluidic systems are small mechanical systems that involve the flow of fluids. Microfluidic systems can be used in many different fields, such as biomedical, chemical, genetic, biochemical, pharmaceutical, haptics, and other fields. A microfluidic valve is a basic component of microfluidic system and may be used for stopping, starting, or otherwise controlling flow of a fluid in a microfluidic system. Conventional microfluidic valves may be actuated via fluid pressure, with a piezoelectric material, or a spring-loaded mechanism, for example.

Manufacturing of reusable and reliable valves at the scale of microfluidic systems can be challenging. For example, it can be difficult to form the valves at such a small scale in a manner that reliable seals (e.g., at the valve seat, between components of the valve, etc.) may be made with the valves. Additionally, moving parts in small mechanisms like microfluidic valves can be fragile and difficult to control without causing damage.

Accordingly, the present disclosure recognizes a need and provides solutions for improved microfluidic valves and systems, methods for controlling a fluid flow in microfluidic systems, and methods for manufacturing microfluidic valves and systems.

SUMMARY

As will be described in greater detail below, the instant disclosure describes microfluidic valves, microfluidic systems, and related methods. For example, microfluidic valves of the present disclosure may include a gate transmission element separating an input gate terminal from an output gate terminal. The gate transmission element may include a flexible membrane coupled to a plunger, which may be movable between open and closed positions to control flow of a subject fluid through a fluid channel.

In some embodiments, the present disclosure includes microfluidic valves. The microfluidic valves may include a valve body having at least one cavity therein and a gate transmission element disposed within the cavity and separating the cavity into an input gate terminal and an output gate terminal. The gate transmission element may include a flexible membrane and a plunger coupled to the flexible membrane. A gate port may be configured to direct drive fluid into the input gate terminal to pressurize the input gate terminal. A fluid channel may include an inlet port, a restricting region, and an outlet port. The fluid channel may be configured to convey a subject fluid from the inlet port, through the restricting region, and to the outlet port. The gate transmission element may be configured to move within the cavity to restrict the restricting region to inhibit the flow of subject fluid from the inlet port to the outlet port upon pressurization of the input gate terminal, and to expand the restricting region to allow or increase the flow of subject fluid from the inlet port to the outlet port upon depressurization of the input gate terminal.

In some examples, the restricting region may be at least partially defined by a flexible bubble positioned within the output gate terminal, over the inlet port and the outlet port, and between the plunger and the inlet port and outlet port. The flexible bubble may separate the output gate terminal into the restricting region within the flexible bubble and an output gate exhaust chamber between an exterior of the flexible bubble and the gate transmission element. The plunger may be configured to, upon pressurization of the input gate terminal, press against the flexible bubble to contract the restricting region. The valve body may also include an exhaust outlet configured to direct fluid to and from the output gate exhaust chamber. The output gate exhaust chamber may be configured to be pressurized and depressurized through the exhaust outlet. The valve body may, in some examples, include a gate body portion disposed between the flexible membrane and a flexible material forming the flexible bubble, a drive body portion disposed on an opposite side of the flexible membrane from the gate body portion and comprising the gate port, and a fluid channel body portion disposed on an opposite side of the flexible material forming the flexible bubble from the gate body portion and comprising the inlet port and the outlet port.

In additional examples, a cross-sectional area of the cavity taken parallel to the flexible membrane may be about 25 $mm^2$ or less, such as about 1 $mm^2$ or less. The plunger may be chemically bonded to the flexible membrane. The valve body may include at least one of silicon, silicon dioxide, glass, polycarbonate, or a rigid polymer. The flexible membrane may include a polymer material, such as a polysiloxane material.

In some embodiments, the present disclosure includes microfluidic systems. The microfluidic systems may include a microfluidic valve, a drive fluid source, a subject fluid source, and a fluid-driven mechanism. The microfluidic valve may include a valve body having at least one cavity therein and a gate transmission element disposed within the cavity and separating the cavity into an input gate terminal and an output gate terminal. A gate port may be configured to direct drive fluid into the input gate terminal to pressurize the input gate terminal. An inlet port may be configured to convey a subject fluid into a restricting region of a fluid channel. An outlet port may be configured to convey the subject fluid out of the restricting region of the fluid channel. A flexible bubble may be positioned within the fluid channel between the inlet port and the outlet port. The flexible bubble may define the restricting region in the fluid channel that may be configured to be deformed to block the fluid channel between the inlet port and outlet port to inhibit subject fluid flow from the inlet port to the outlet port upon pressurization of the input gate terminal, and to allow subject fluid flow from the inlet port to the outlet port upon depressurization of the input gate terminal. The drive fluid source may be configured to convey the drive fluid into or out of the input gate terminal through the gate port. The subject fluid source may be configured to convey the subject fluid to the inlet port. The fluid-driven mechanism may be configured to receive the subject fluid from the outlet port.

In some examples, the gate transmission element may include a flexible membrane and a plunger disposed within the cavity and coupled to the flexible membrane. The plunger may be configured to press against the flexible bubble upon pressurization of the input gate terminal to block the restricting region between the inlet port and the outlet port. The fluid-driven mechanism may include at least one of a microelectromechanical device, an expansible cavity, a piston system, or a haptic feedback device. A surface area of the flexible membrane within the cavity may, in some embodiments, be larger than a surface area of the flexible bubble.

In some embodiments, the present disclosure includes methods of controlling flow of a subject fluid in a microfluidic system. In accordance with such methods, a subject fluid may be conveyed through a restricting region of a fluid channel from an inlet port to an outlet port. A drive fluid may be flowed from a gate port into an input gate terminal within a cavity in a microfluidic valve body. The output gate terminal and an input gate terminal may be separated from each other by a gate transmission element, which may include a flexible membrane and a plunger coupled to the flexible membrane. Responsive to the drive fluid flowing into the input gate terminal, the gate transmission element may be moved to press against and deform a flexible bubble positioned within the output gate terminal. The flexible bubble may separate the output gate terminal from the restricting region. Flow of the subject fluid from the inlet port to the outlet port may be inhibited by blocking the restricting region with the deformed flexible bubble.

In some examples, the methods of controlling the flow of the subject fluid may include flowing the subject fluid from the outlet port into a fluid-driven mechanism to activate the fluid-driven mechanism. Activating the fluid-driven mechanism may include activating a haptic feedback device of an artificial reality system. The drive fluid may be withdrawn from the input gate terminal through the gate port to move the gate transmission element to relieve pressure against the flexible bubble and to unblock the restricting region.

In some embodiments, the present disclosure may include methods of fabricating a microfluidic valve. In accordance with such methods, a cavity may be formed within a microfluidic valve body. A gate transmission element may be positioned within the cavity. The gate transmission element may separate the cavity into an input gate terminal and an output gate terminal. A fluid channel may be formed to include an inlet port, a restricting region, and an outlet port within the microfluidic valve body. The gate transmission element may be positioned and configured to move back and forth upon pressurization and depressurization of the input gate terminal to restrict the restricting region to inhibit flow of a subject fluid from the inlet port to the outlet port upon pressurization of the input gate terminal and to expand the restricting region to allow or increase flow of the subject fluid from the inlet port to the outlet port upon depressurization of the input gate terminal.

In some examples, positioning the gate transmission element within the cavity may include positioning a plunger within the output gate terminal and coupling the plunger to a flexible membrane. A flexible bubble may be positioned within the output gate terminal and over the inlet port and the outlet port. The restricting region may be defined in the fluid channel between the inlet port and outlet port and within the flexible bubble. The plunger may be configured to deform the flexible bubble upon pressurization of the input gate terminal to block the restricting region with the deformed flexible bubble to inhibit flow of the subject fluid from the inlet port to the outlet port. Forming the cavity within the microfluidic valve body may include forming the cavity to have a cross-sectional area taken parallel to the flexible membrane of about 1 mm$^2$ or less. An exhaust outlet may be formed in the microfluidic valve body. The exhaust outlet may be in fluid communication with the output gate terminal.

In some examples, forming the cavity within the microfluidic valve body may include forming the input gate terminal within a drive body portion of the microfluidic valve body and forming the output gate terminal within a gate body portion of the microfluidic valve body. The flexible membrane may be formed on a surface of the gate body portion. The drive body portion may be coupled to the gate body portion, and a fluid channel body portion may be coupled to the gate body portion. A flexible bubble may be formed on a surface of the fluid channel body portion. At least one alignment mark may be formed on or in at least one of the drive body portion, the gate body portion, or the fluid channel body portion. Coupling the drive body portion to the gate body portion and coupling the fluid channel body portion to the gate body portion may include using the at least one alignment mark to align the drive body portion, gate body portion, and fluid channel body portion to each other.

In some examples, forming the cavity within the microfluidic valve body may include performing at least one photolithography operation. Forming the cavity within the microfluidic valve body may include forming the cavity within at least one of a silicon material, a silicon dioxide material, a glass material, a polycarbonate material, or a rigid polymer material.

In some embodiments, the present disclosure includes methods of fabricating microfluidic systems. In accordance with such methods, a microfluidic valve may be formed. For example, a material may be removed from a drive body portion to form an input gate terminal and a gate port into the input gate terminal. A flexible membrane may be formed on a gate body portion. Material from the gate body portion may be removed to form an output gate terminal and to define a plunger within the output gate terminal, the plunger being bonded to the flexible membrane. A flexible bubble may be formed on a fluid channel body portion. Material may be removed from the fluid channel body portion to form an inlet port and an outlet port in fluid communication with an interior of the flexible bubble. The drive body portion may be coupled to the gate body portion and the input gate terminal may be separated from the output gate terminal with the flexible membrane. The gate body portion may be coupled to the fluid channel body portion. A drive fluid source may be operably coupled to the gate port. A subject fluid source may be operably coupled to the inlet port. A fluid-driven mechanism may be operably coupled to the outlet port to be operated by subject fluid when the microfluidic valve is in an open state.

In some examples, forming the microfluidic valve may include simultaneously forming a plurality of microfluidic valves. Coupling the drive body portion to the gate body portion may include bonding a drive body substrate material including a plurality of drive body portions to a gate body substrate material including a plurality of gate body portions. Coupling the gate body portion to the fluid channel body portion may include bonding the gate body substrate material including the plurality of gate body portions to a fluid channel body substrate material including a plurality of fluid channel body portions.

In some examples, removing material from the drive body portion, removing material from the gate body portion, and removing material from the fluid channel body portion may include performing a photolithography operation to selectively remove the material. Forming the flexible bubble on the fluid channel body portion may include forming a block on the fluid channel body portion, forming a flexible material over the block and the fluid channel body portion, and removing the block while leaving the flexible material to remain on the fluid channel body portion. Removing the block may include removing a material of the block through at least one of the inlet port or the outlet port using a selective material removal process. Each of forming the flexible material over the block and the fluid channel body portion and forming the flexible membrane on the gate body portion may include forming an elastomeric material. Operably coupling the fluid-driven mechanism to the outlet port may include operably coupling, to the outlet port, at least one of a microelectromechanical deice, an expansible cavity, a piston system, or a haptic feedback device. Forming the flexible bubble on the fluid channel body portion may, in some embodiments, include forming the flexible bubble to have a surface area that is smaller than a surface area of the flexible membrane separating the input gate terminal and the output gate terminal. Coupling the gate body portion to the fluid channel body portion may include abutting the plunger against the flexible bubble.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 2 is a schematic top view of a microfluidic system, according to at least one embodiment of the present disclosure.

FIG. 3A is transparent perspective view of a microfluidic valve, according to at least one embodiment of the present disclosure.

FIG. 3B is a partially transparent top view of the microfluidic valve of FIG. 3A, according to at least one embodiment of the present disclosure.

Figure 1:
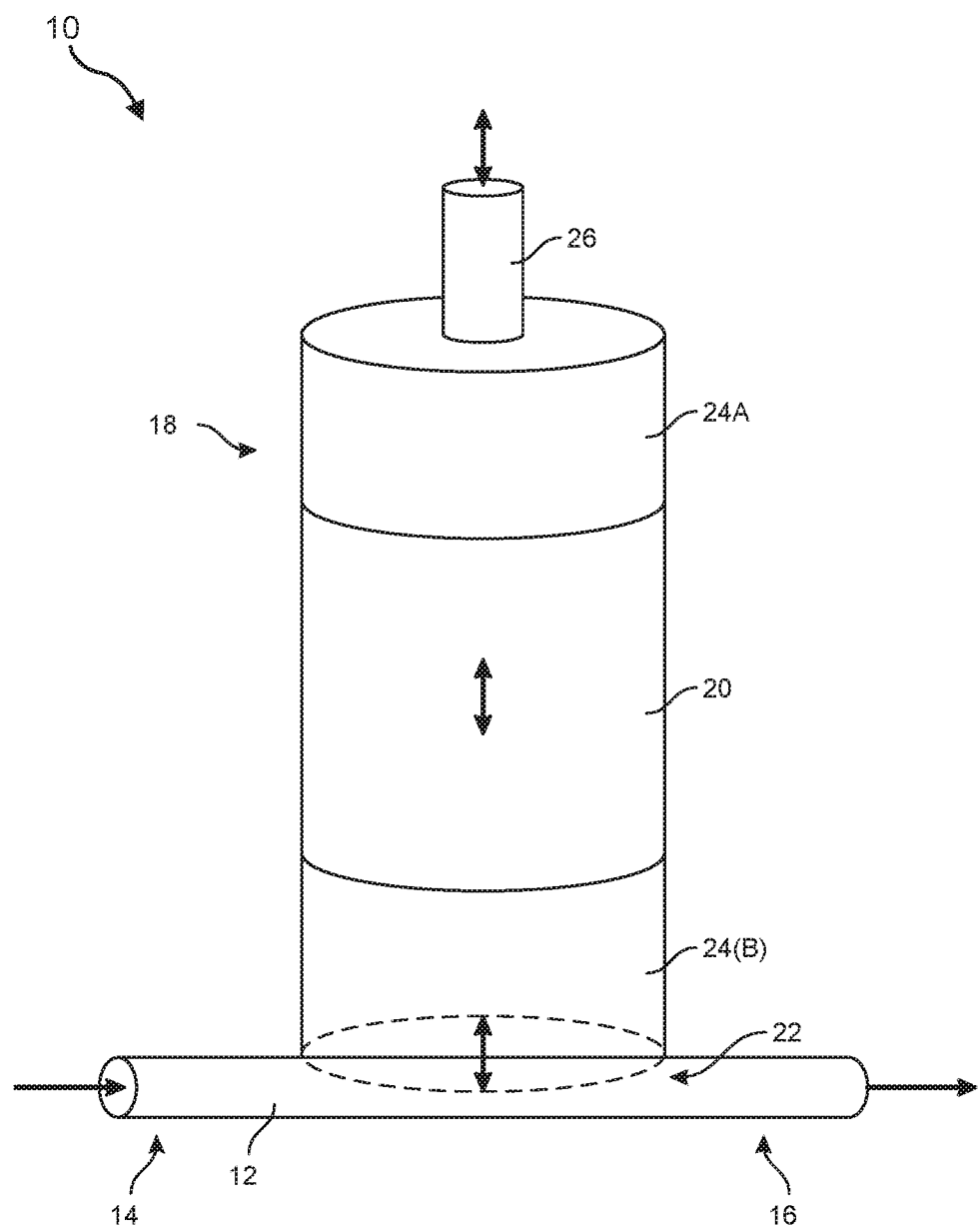
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to microfluidic valves, systems, and related methods. As will be explained in greater detail below, embodiments of the instant disclosure may include microfluidic valves that have a flexible membrane disposed within a cavity in a valve body. The flexible membrane may separate the cavity into an input gate terminal and an output gate terminal. An inlet port may be configured to direct subject fluid into the restricting region, and an outlet port may be configured to direct subject fluid out of the restricting region when the microfluidic valve is in an open state. A plunger may be disposed within the cavity and coupled to the flexible membrane. The flexible membrane and the plunger may be configured to move within the cavity to inhibit subject fluid flow from the inlet port to the outlet port upon pressurization of the input gate terminal and to allow subject fluid flow upon depressurization of the input gate terminal. In some embodiments, a flexible bubble may be positioned within the output gate terminal and over the restricting region. Microfluidic systems may incorporate such microfluidic valves. Related methods of controlling flow of a fluid and of fabricating microfluidic systems are also disclosed.

Figure 40:
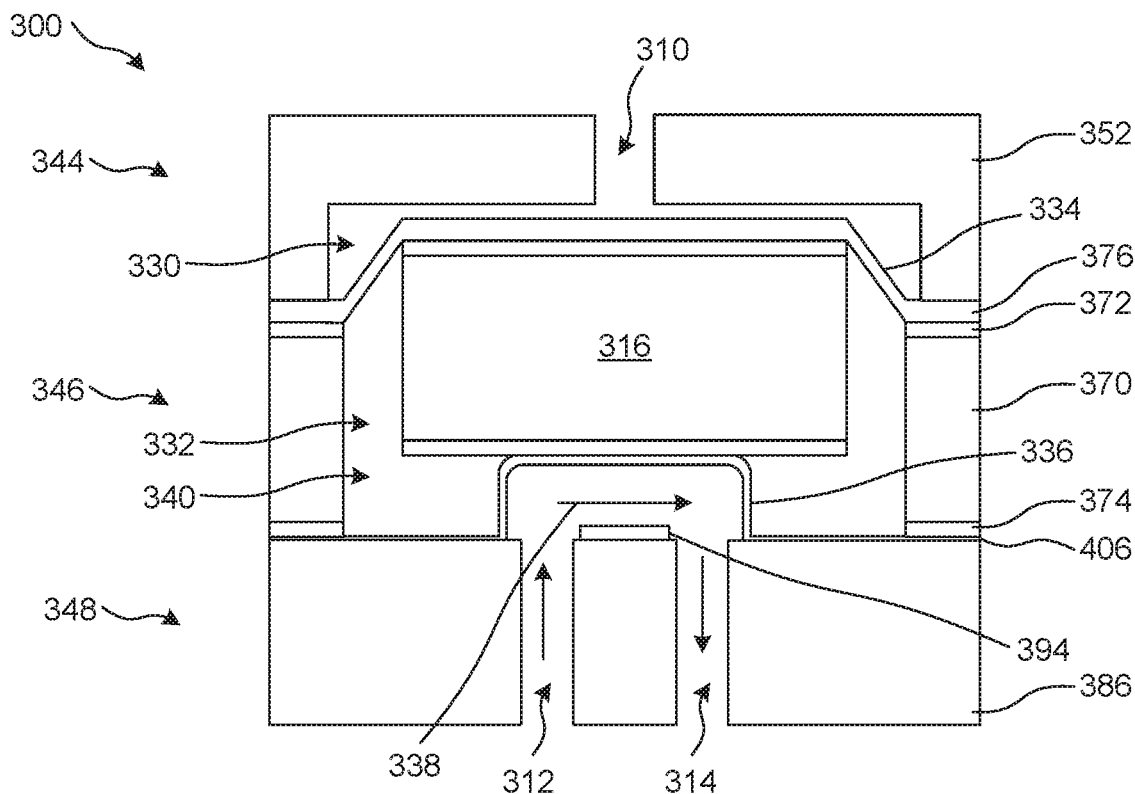
FIG. 40 illustrates a cross-sectional view of an assembled microfluidic valve in an open state, according to at least one embodiment of the present disclosure.
Figure 41:
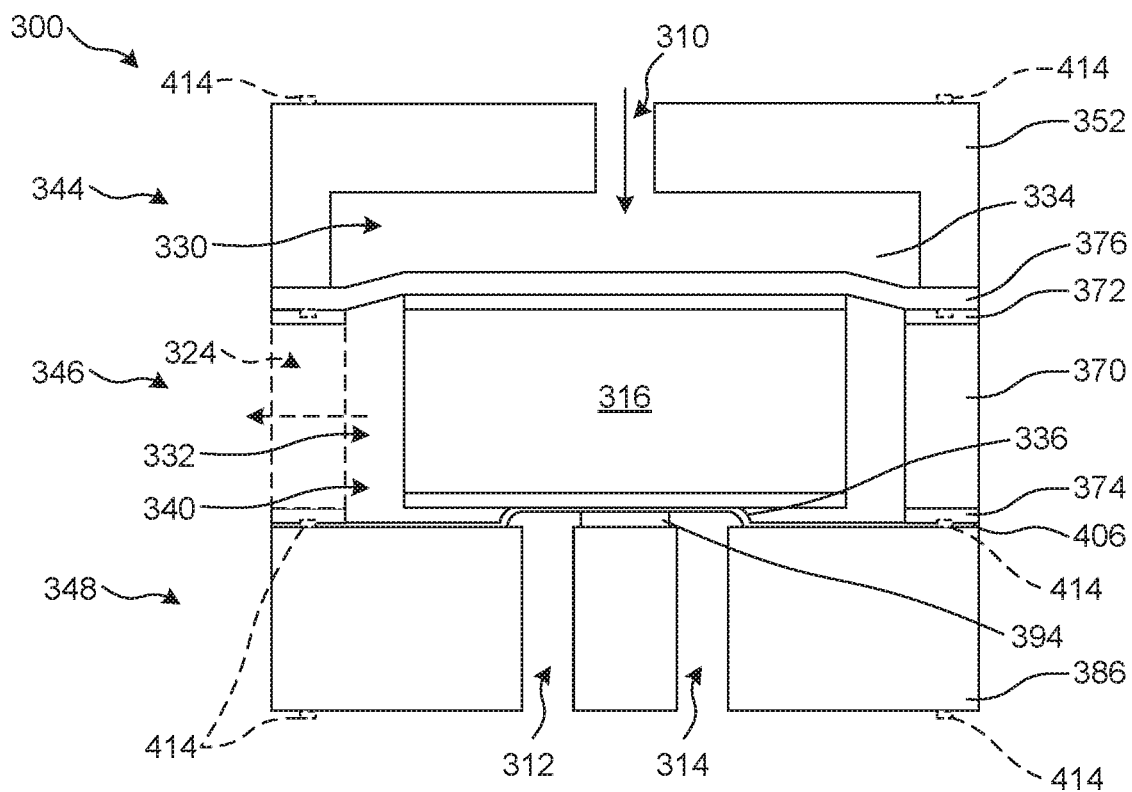
FIG. 41 illustrates a cross-sectional view of the assembled microfluidic valve of FIG. 40 in a closed state, according to at least one embodiment of the present disclosure.
Figure 42:
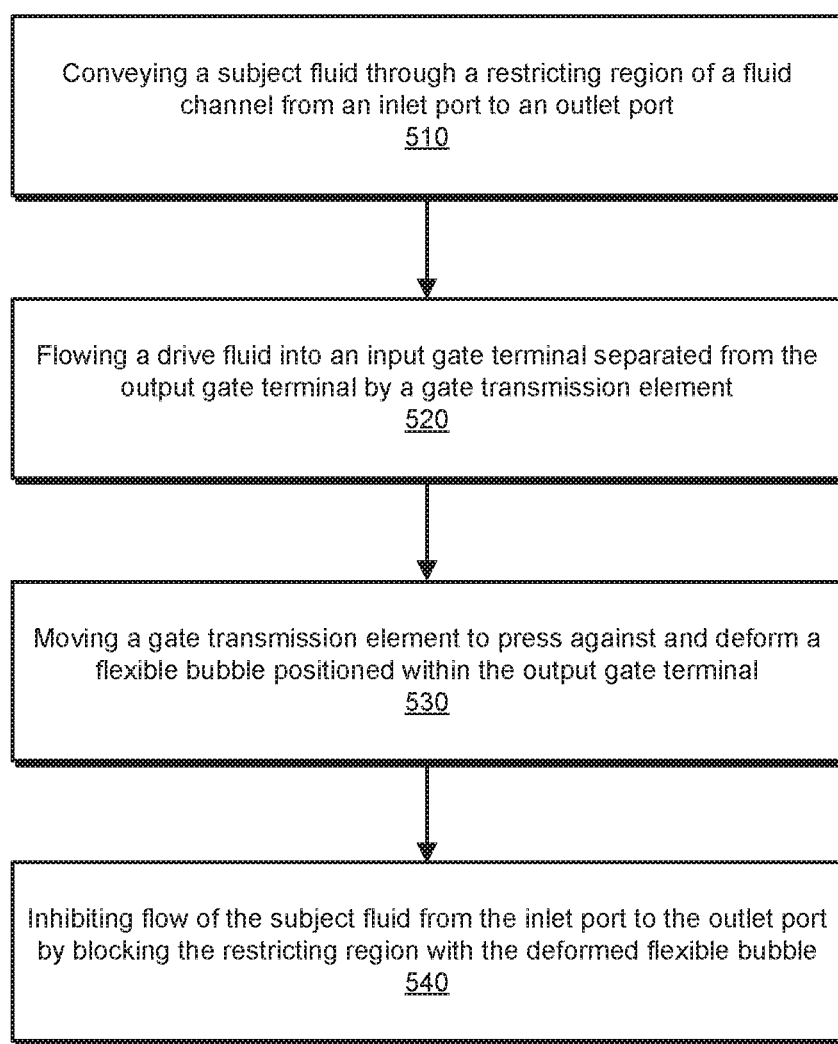
FIG. 42 is a flow diagram illustrating a method of controlling flow of a subject fluid in a microfluidic system, according to at least one embodiment of the present disclosure.
Figure 43:
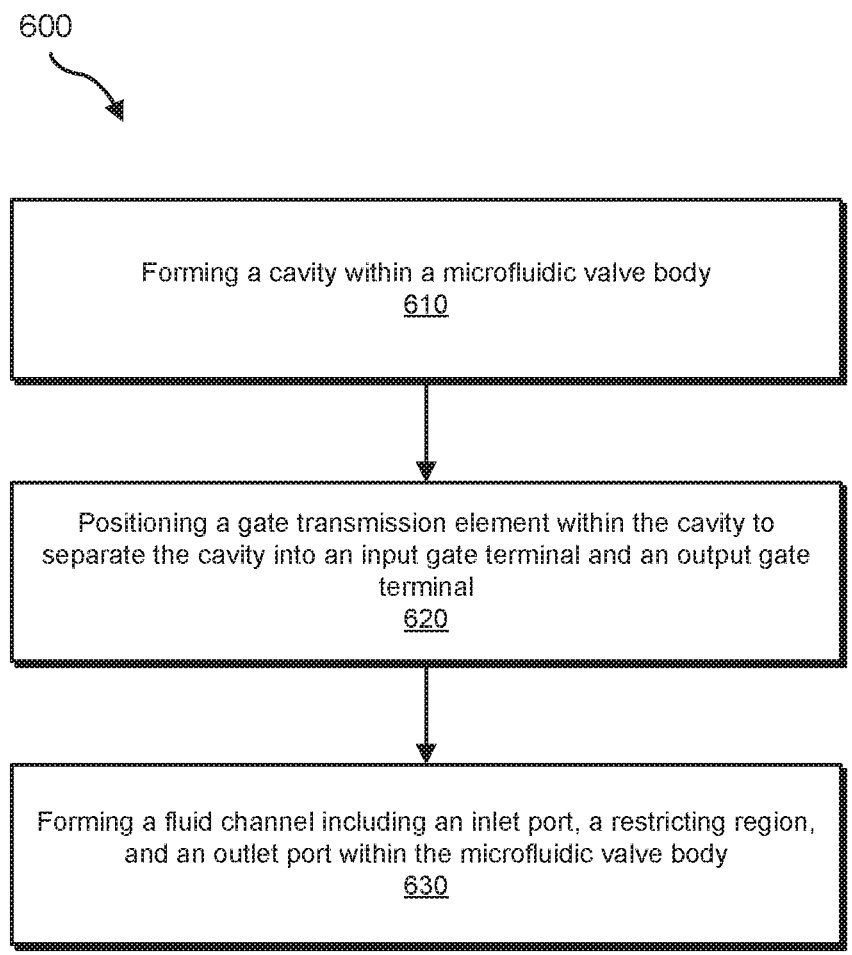
FIGS. 43 and 44 are flow diagrams illustrating methods of fabricating microfluidic systems, respectively according to at least one embodiment of the present disclosure.
Figure 44:
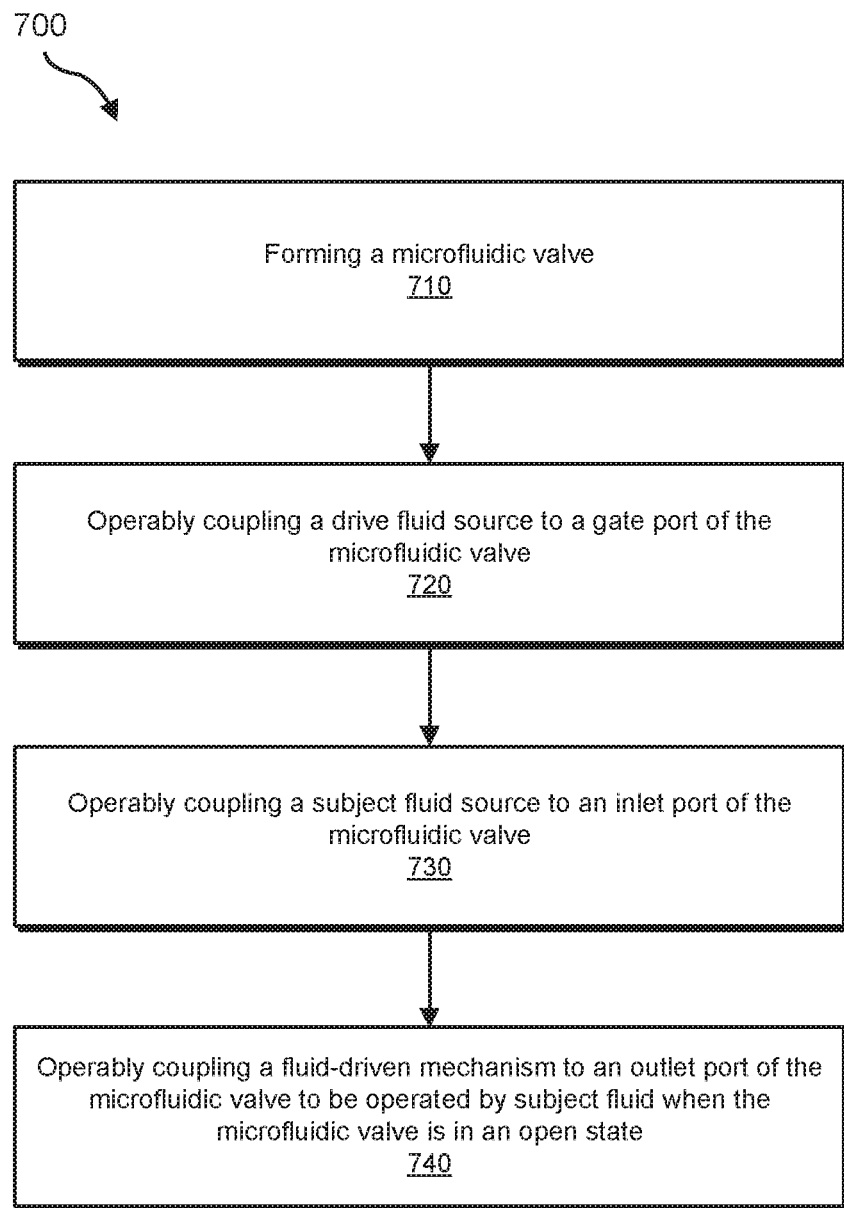
Figure 48:
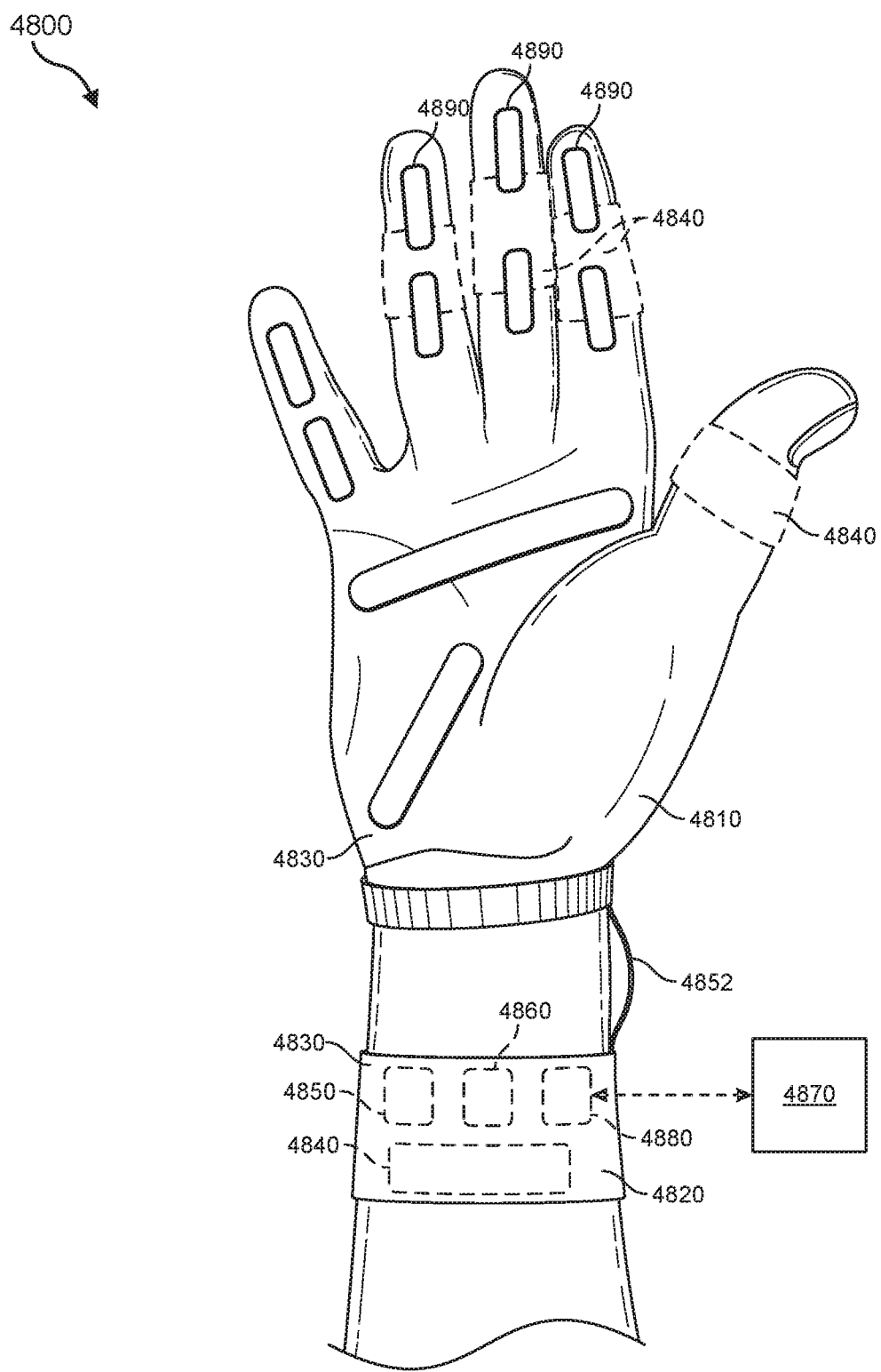
FIG. 48 is an illustration of example haptic devices that may be used in connection with embodiments of this disclosure.
Figure 49:
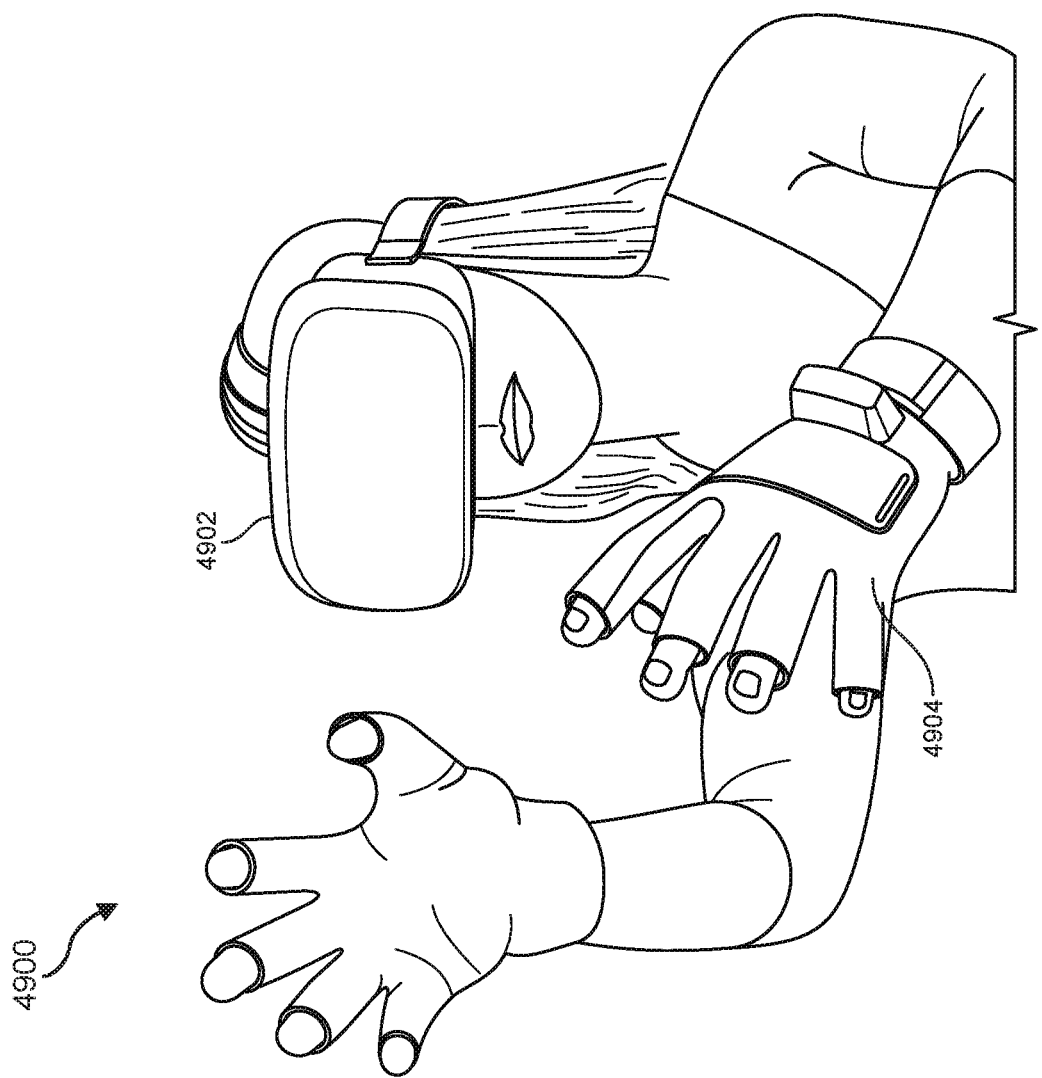
FIG. 49 is an illustration of an example virtual-reality environment according to embodiments of this disclosure.
Figure 50:
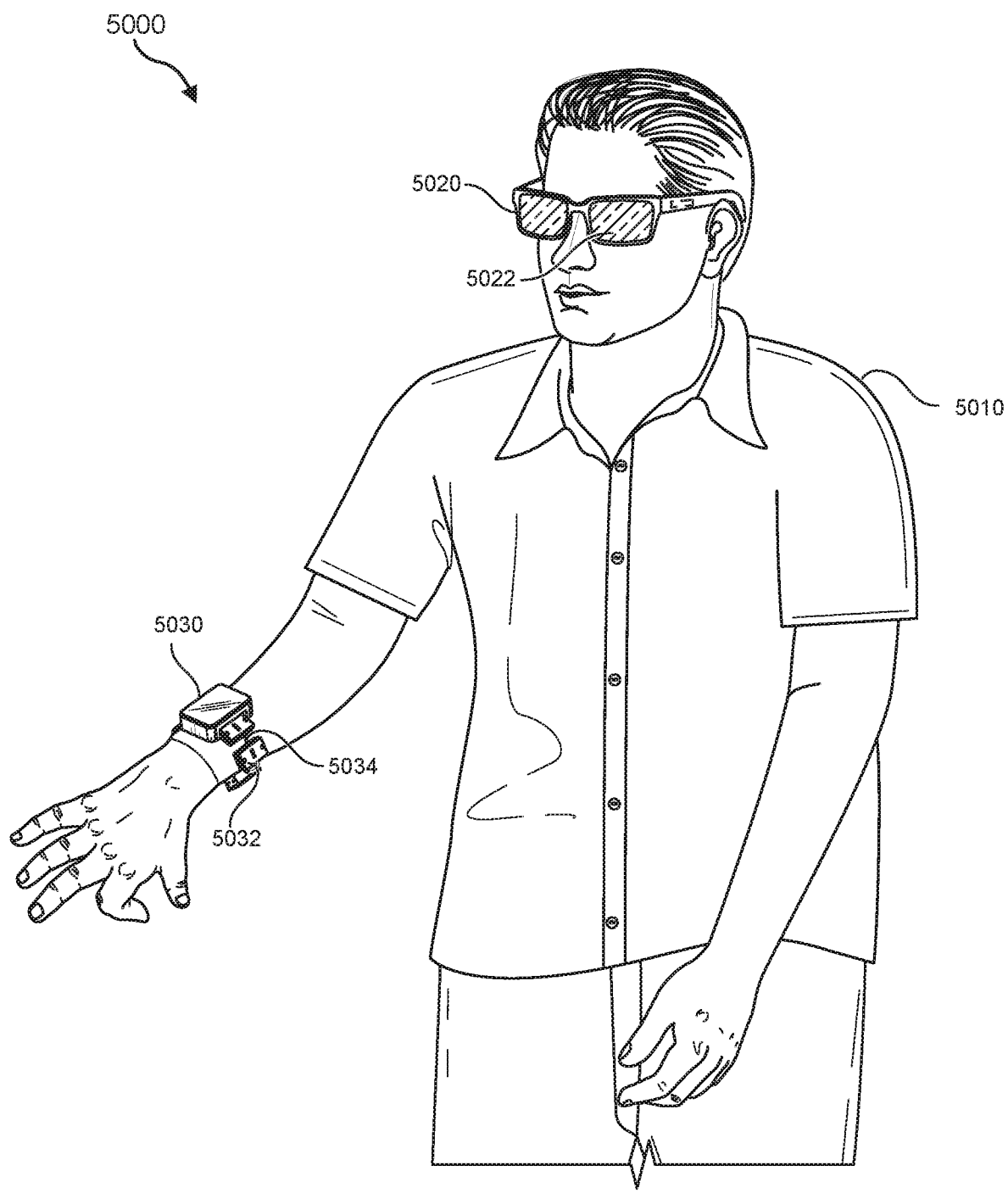
FIG. 50 is an illustration of an example augmented-reality environment according to embodiments of this disclosure.

The following will provide, with reference to FIGS. 1-5, detailed descriptions of example fluidic systems and valves (e.g., microfluidic systems and microfluidic valves). With reference to FIGS. 6-39, detailed descriptions are provided of various stages of manufacture of a microfluidic valve. With reference to FIGS. 40 and 41, detailed descriptions are provided of an example microfluidic valve in an open and closed state, respectively. With reference to FIG. 42, detailed descriptions of an example method of controlling fluid flow are provided. With reference to FIGS. 43 and 44, detailed descriptions are provided of example methods of fabricating microfluidic systems. Detailed descriptions of various artificial reality systems are provided with reference to FIGS. 45-47. With reference to FIGS. 48-50, detailed descriptions are provided of example systems and devices for haptics, artificial reality, and virtual reality.

The present disclosure may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 10 for controlling flow through a fluid channel 12, according to at least one embodiment of the present disclosure. Fluid from a fluid source (e.g., a pressurized fluid source, a fluid pump, etc.) may flow through the fluid channel 12 from an inlet port 14 to an outlet port 16, which may be operably coupled to, for example, a fluid-driven mechanism, another fluid channel, or a fluid reservoir.

Fluidic valve 10 may include a gate 18 for controlling the fluid flow through the fluid channel 12. The gate 18 may include a gate transmission element 20, which may be a movable component that is configured to transmit an input force, pressure, or displacement to a restricting region 22 to restrict or stop flow through the fluid channel 12. Conversely, in some examples, application of a force, pressure, or displacement to the gate transmission element 20 may result in opening the restricting region 22 to allow or increase flow through the fluid channel 12. The force, pressure, or displacement applied to the gate transmission element 20 may be referred to as a gate force, gate pressure, or gate displacement. The gate transmission element 20 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, the gate 18 of the fluidic valve 10 may include one or more gate terminals, such as an input gate terminal 24A and an output gate terminal 24B (collectively referred to herein as "gate terminals 24") on opposing sides of the gate transmission element 20. The gate terminals 24 may be elements for applying a force (e.g., pressure) to the gate transmission element 20. By way of example, the gate terminals 24 may each be or include a fluid chamber adjacent to the gate transmission element 20. Alternatively or additionally, one or more of the gate terminals 24 may include a solid component, such as a lever, screw, or piston, that is configured to apply a force to the gate transmission element 20.

In some examples, a gate port 26 may be in fluid communication with the input gate terminal 24A for applying a positive or negative fluid pressure within the input gate terminal 24A. A control fluid source (e.g., a pressurized fluid source, a fluid pump, etc.) may be in fluid communication with the gate port 26 to selectively pressurize and/or depressurize the input gate terminal 24A. In additional embodiments, a force or pressure may be applied at the input gate terminal 24A in other ways, such as with a piezoelectric element or an electromechanical actuator, etc.

In the embodiment illustrated in FIG. 1, pressurization of the input gate terminal 24A may cause the gate transmission element 20 to be displaced toward the restricting region 22, resulting in a corresponding pressurization of the output gate terminal 24B. Pressurization of the output gate terminal 24B may, in turn, cause the restricting region 22 to partially or fully restrict to reduce or stop fluid flow through the fluid channel 12. Depressurization of the input gate terminal 24A may cause the gate transmission element 20 to be displaced away from the restricting region 22, resulting in a corresponding depressurization of the output gate terminal 24B. Depressurization of the output gate terminal 24B may, in turn, cause the restricting region 22 to partially or fully expand to allow or increase fluid flow through the fluid channel 12. Thus, the gate 18 of the fluidic valve 10 may be used to control fluid flow from the inlet port 14 to the outlet port 16 of the fluid channel 12.

FIG. 2 is a schematic top view of a microfluidic system 100 that includes a microfluidic valve 102, a fluid-driven mechanism 104 configured to be activated by the microfluidic valve 102, a drive fluid source 106 for driving the microfluidic valve 102, and a subject fluid source 108 for flowing a subject fluid to activate the fluid-driven mechanism 104. The flow of the subject fluid may be controlled by a gate the microfluidic valve 102. A gate port 110 may provide fluid communication between the drive fluid source 106 and the microfluidic valve 102. An inlet port 112 may provide fluid communication between the subject fluid source 108 and the microfluidic valve 102. An outlet port 114 may provide fluid communication between the microfluidic valve 102 and the fluid-driven mechanism 104. The microfluidic valve 102 may include a plunger 116 that may be movable within a cavity 118 to open and close the microfluidic valve 102 for controlling flow of the subject fluid.

The microfluidic system 100 may include a substrate 120, within which or on which at least some of the components of the microfluidic system 100 are disposed. For example, at least a portion of the substrate 120 may define one or more of a valve body 122 of the microfluidic valve 102, the drive fluid source 106, the subject fluid source 108, the gate port 110, the inlet port 112, the outlet port 114, the cavity 118, and/or the fluid-driven mechanism 104. In some embodiments, the substrate 120 may include a stack of materials, such as a drive body portion, at least one flexible material (e.g., an elastic material), a gate body portion, and/or a fluid channel body portion. In some examples, the term "flexible" may mean capable of flexing and/or returning to an original state without permanent damage. A flexible material may also be stretchable. In some examples, the substrate 120 may include at least one of silicon, silicon dioxide, a glass, and/or a rigid polymer (e.g., a polycarbonate material, an acrylic material, a urethane material, a fluorinated elastomer material, a polysiloxane material, etc.).

The fluid-driven mechanism 104 may be any mechanism that may be driven or controlled by flowing and/or pressurization of the subject fluid at a microfluidic scale. By way of example and not limitation, the fluid-driven mechanism 104 may include at least one of a microelectromechanical device (e.g., a so-called "MEMS" device), an expansible cavity, a piston system, and/or a haptic feedback device.

Each of the drive fluid source 106 and the subject fluid source 108 may be any source or mechanism that can provide a pressurized fluid (e.g., gas (e.g., air, nitrogen, etc.) or liquid (e.g., water, oil, etc.) to the microfluidic valve 102. By way of example and not limitation, the drive fluid source 106 and the subject fluid source 108 may each be or include a pressurized reservoir, a fan, a pump, or a piston system, etc.

Optionally, in some embodiments, an exhaust outlet 124 (shown in FIG. 2 in dashed lines) may be in fluid communication with the microfluidic valve 102. The exhaust outlet 124 may enable one or more chambers within the microfluidic valve 102 to expand and/or contract as the plunger 116 is moved back and forth to open or close the microfluidic valve 102, as will be explained in further detail below.

In some embodiments, the microfluidic system 100 may be incorporated in a haptic feedback device, such as for use with an artificial reality (e.g., virtual reality, augmented reality, mixed reality, or hybrid reality) system. The microfluidic system 100 may be positioned on or in a wearable device (e.g., a headband, a head-mounted display, a glove, an armband, etc.) that is configured to provide haptic feedback (e.g., vibration, pressure, etc.) to a user. For example, the fluid-driven mechanism 104 of the microfluidic system 100 may be an expansible cavity configured to fill and expand with the subject fluid upon opening of the microfluidic valve 102. The expanding cavity may press against the user, and the user may sense the pressure from the expanding cavity, such as resulting from an action taken by the user in the artificial reality. By way of example, the microfluidic system 100 may be incorporated in a finger of a glove, and the user may use his or her finger in space to make a selection in an artificial reality environment. The expansible cavity of the microfluidic system 100 may be filled and expanded with the subject fluid to provide a pressure point on the user's finger to confirm the selection made by the user. The pressure point may provide a sensation that the user is touching a real object. Alternatively, the fluid-driven mechanism 104 may include an eccentric rotating element that may be rotated by the flowing subject fluid when the microfluidic valve 102 is in an open state, resulting in a vibrating sensation as haptic feedback for the user.

Examples of architectures that may be used for the microfluidic valve 102 are described below in connection with FIGS. 3A-5, 40, and 41.

FIGS. 3A-5 illustrate various views of a microfluidic valve 200 according to at least one embodiment of the present disclosure. The microfluidic valve 200 shown in FIGS. 3A-5 may be used as the microfluidic valve 102 of the microfluidic system 100 shown in FIG. 2, for example.

The microfluidic valve 200 may include a gate port 210 for controlling a gate 211. The gate 211 may control flow of a subject fluid through a fluid channel from an inlet port 212 to an outlet port 214. The gate port 210, inlet port 212, and outlet port 214 may each pass through a valve body 222 and into a cavity 218 formed in the valve body 222. The cavity 218 may be divided into an input gate terminal 230 and an output gate terminal 232 separated by a flexible membrane 234. The gate port 210 may be in fluid communication with the input gate terminal 230. A plunger 216 may be disposed within the cavity 218 and may be configured to move back and forth (e.g., up and down from the perspective of FIGS. 3A, 4, and 5) to open and close the microfluidic valve 200. The plunger 216 may be coupled to (e.g., adhered to, chemically bonded to, fastened to) the flexible membrane 234. The plunger 216 and the flexible membrane 234 may together define a gate transmission element of the microfluidic valve 200. The flexible membrane 234 may be formed of a polymer (e.g., an elastomeric material, such as a polysiloxane material).

In some embodiments, a flexible bubble 236 may be positioned within the output gate terminal 232, over the inlet port 212 and the outlet port 214, and between the plunger and the inlet port 212 and outlet port 214. The flexible bubble 236 may be formed of a polymer (e.g., an elastomeric material, such as a polysiloxane material). The flexible bubble 236 may separate the output gate terminal 232 from a restricting region 238 (identified in FIGS. 4 and 5) of the fluid channel within the flexible bubble 236 and an output gate exhaust chamber 240 (identified in FIGS. 4 and 5) between an exterior of the flexible bubble 236 and the flexible membrane 234. The plunger 216 may be positioned within the output gate exhaust chamber 240. In some embodiments, at least one exhaust outlet 224 may be in fluid communication with the output gate exhaust chamber 240, enabling the output gate exhaust chamber 240 to freely (i.e., without resistance from fluid pressure within the output gate exhaust chamber 240) expand and contract upon pressurization and depressurization of the input gate terminal 230.

The valve body 222 may include a drive body portion 244 at least partially defining the input gate terminal 230, a gate body portion 246 at least partially defining the plunger 216 and/or the output gate terminal 232, and a fluid channel body portion 248 at least partially defining the inlet port 212 and the outlet port 214. The drive body portion 244 and the gate body portion 246 may be separated from each other and coupled to (e.g., adhered to, chemically bonded to) each other by the flexible membrane 234. The gate body portion 246 and the fluid channel body portion 248 may be separated from each other and coupled to (e.g., adhered to, chemically bonded to) each other by a flexible material 250 forming the flexible bubble 236.

Figure 4:
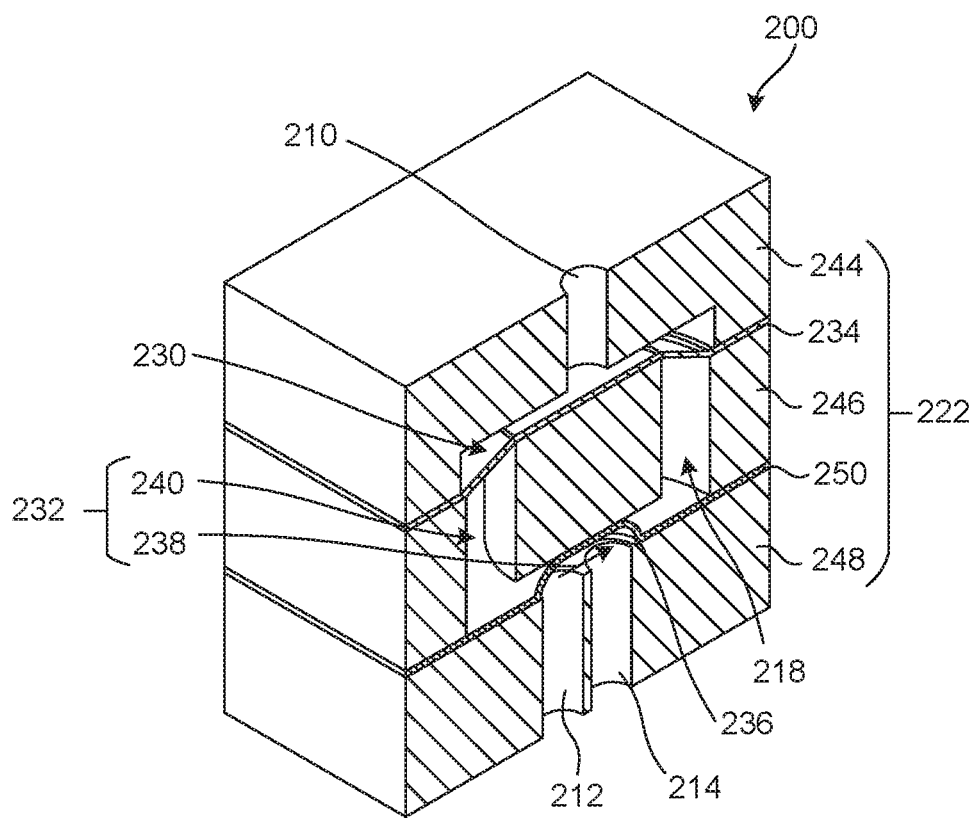
FIG. 4 is a cross-sectional perspective view of the microfluidic valve of FIG. 3A, according to at least one embodiment of the present disclosure.
Figure 5:
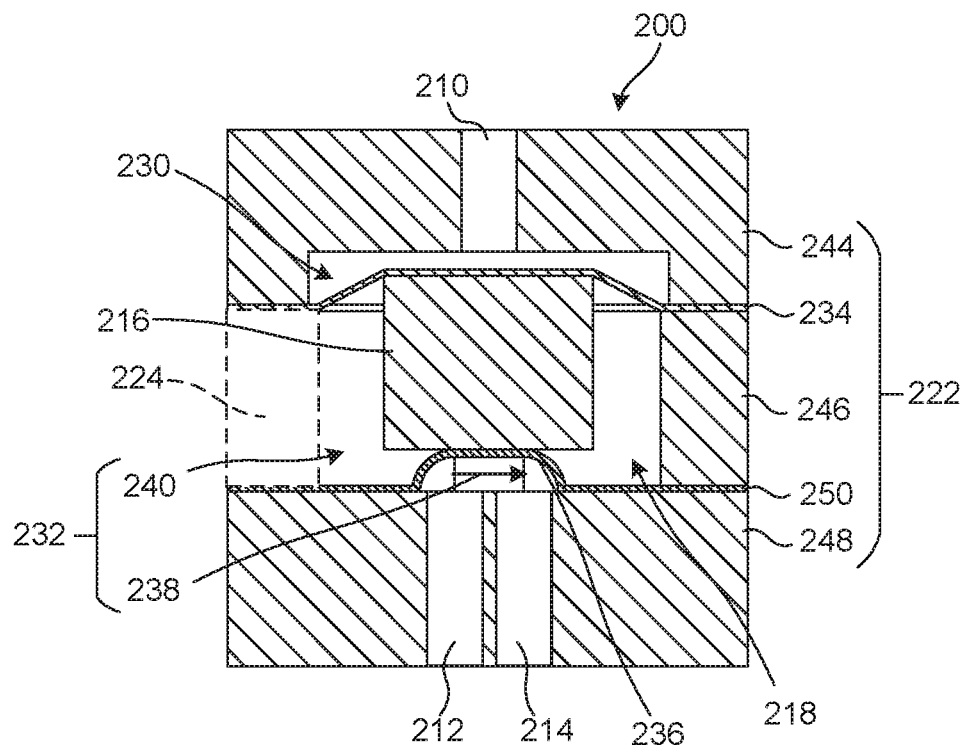
FIG. 5 is a cross-sectional side view of the microfluidic valve of FIG. 3A, according to at least one embodiment of the present disclosure.

Sufficient pressurization and depressurization of the input gate terminal 230 by introducing or withdrawing a drive fluid through the gate port 210 may move the plunger 216 and the flexible membrane 234 respectively down and up (from the perspective of FIGS. 3A, 4, and 5). Thus, when the input gate terminal 230 is sufficiently pressurized, the plunger 216 may be moved downward to restrict (e.g., shrink, block) the restricting region 238 between the inlet port 212 and the outlet port 214. In some embodiments, the downward movement of the plunger 216 may press against and deform (e.g., depress) the flexible bubble 236 to contract the restricting region 238. Blocking the restricting region 238 may inhibit (e.g., reduce or terminate) subject fluid flow from the inlet port 212 to the outlet port 214, thus closing the microfluidic valve 200.

Upon sufficient depressurization of the input gate terminal 230, the plunger 216 may be moved upward to unblock the restricting region 238. For example, the upward movement of the plunger 216 may relieve pressure on the flexible bubble 236 to allow the restricting region 238 to expand. Expansion of the restricting region 238 may be accomplished by one or both of elastic properties of the flexible bubble 236 and/or the pressurization of the inlet port 212. Unblocking the restricting region 238 may allow the subject fluid to flow from the inlet port 212 to the outlet port 214, thus opening the microfluidic valve 200.

In some examples, the exhaust outlet 224 may be used to pressurize and/or depressurize the output gate exhaust chamber 240, such as to facilitate blocking or unblocking of the restricting region 238.

By way of non-limiting example, a surface area of the flexible membrane 234 within the cavity 218 may be larger than a surface area of the flexible bubble 236. When the input gate terminal 230 is pressurized, a force applied by the plunger 216 against the flexible bubble 236 may be proportional to a ratio of the surface area of the flexible membrane 234 to the surface area of the flexible bubble 236. Therefore, the larger surface area of the flexible membrane 234 compared to the surface area of the flexible bubble 236 may provide a mechanical advantage to close the microfluidic valve 200 with a lower pressure of drive fluid in the input gate terminal 230 than if the surface areas were equal. In some examples, a cross-sectional area of the cavity 218 taken parallel to the flexible membrane (i.e., a surface area of the flexible membrane 234 within the cavity 218) may be about 25 mm$^2$ or less, such as about 1 mm$^2$ or less.

As shown in FIGS. 3A and 3B, the plunger 216 and the cavity 218 may each have a cylindrical shape with a circular cross-section. However, the present disclosure is not so limited. For example, in additional embodiments, one or both of the plunger 216 and/or the cavity 218 may have a cross-sectional shape that is square, rectangular, oval, elliptical, or irregular. The shape and size of the plunger 216, cavity 218, gate port 210, inlet port 212, and outlet port 214 may be selected to adjust the mechanical, fluidic, and functional properties of the microfluidic valve 200.

FIGS. 6-41 illustrate cross-sectional views of various stages of manufacture of a microfluidic valve 300, according to at least one embodiment of the present disclosure. Broadly speaking, the microfluidic valve 300 may be formed my forming and assembling a drive body portion 344, a gate body portion 346, and a fluid channel body portion 348. FIGS. 6-15 illustrate cross-sectional views of various stages of manufacture of the drive body portion 344. FIGS. 16-25 illustrate cross-sectional views of various stages of manufacture of the gate body portion 346. FIGS. 26-39 illustrate cross-sectional views of various stages of manufacture of the fluid channel body portion 348. FIG. 40 illustrates a cross-sectional view of the microfluidic valve 300 with a gate thereof in an open state, after the drive body portion 344, gate body portion 346, and fluid channel body portion 348 are assembled together. FIG. 41 illustrates a cross-sectional view of the assembled microfluidic valve 300 with the gate in a closed state.

Figure 6:
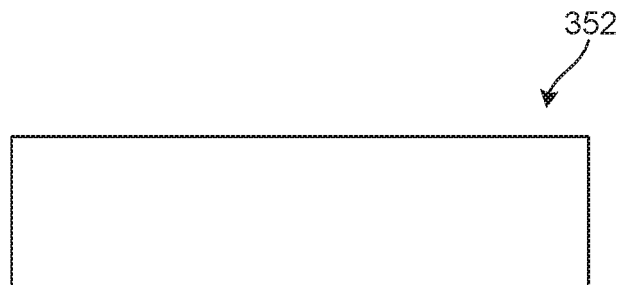
FIGS. 6-15 illustrate cross-sectional views of various stages of manufacture of a drive body portion of a microfluidic valve, according to at least one embodiment of the present disclosure.
Figure 15:
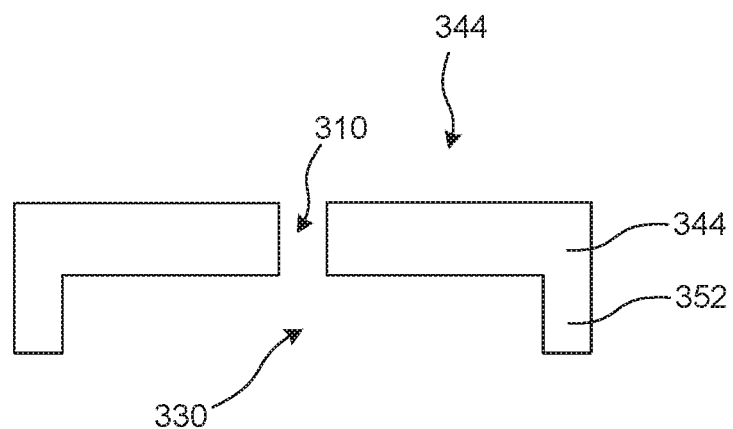

Referring to FIG. 6, a drive body substrate material 352 may be selected for processing to form the drive body portion 344 (shown in its completed state in FIG. 15). By way of example and not limitation, the drive body substrate material 352 may be or include a silicon material, a silicon dioxide material, a glass material, or a rigid polymer material. In some embodiments, the drive body substrate material 352 may be a wafer or other bulk substrate to be processed to include a plurality of drive body portions 344 of respective microfluidic valves 300 (FIG. 40).

Figure 7:
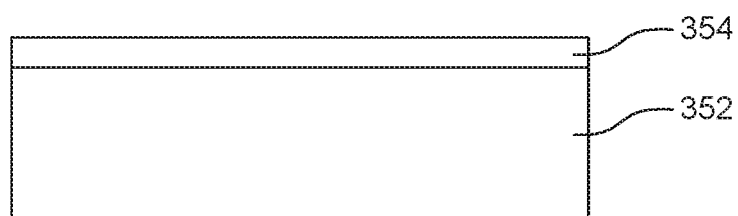

A first photoresist material 354 may be disposed over an upper surface of the drive body substrate material 352, as shown in FIG. 7. The first photoresist material 354 may be capable of patterning via selective exposure to radiation (e.g., ultraviolet light, infrared light, etc.) and development, as is known in the art of photolithography. For example, the first photoresist material 354 may be applied to the drive body substrate material 352 by a spin coating process or another deposition process.

Figure 8:
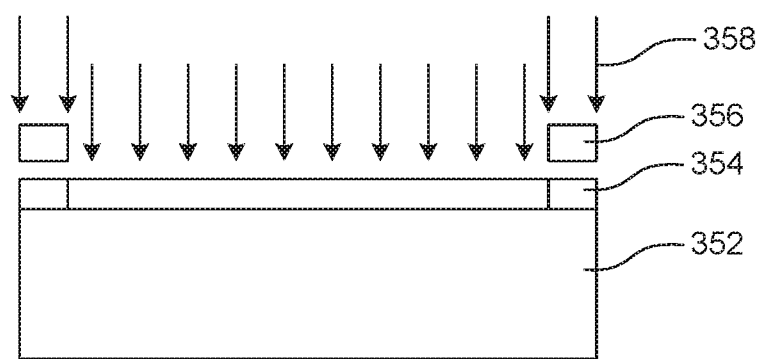

As shown in FIG. 8, a first mask 356 may be positioned over the first photoresist material 354. The first mask 356 may have a pattern of radiation-blocking portions and radiation-transmissive portions (e.g., transparent portions or gaps). The first photoresist material 354 may be selectively radiated through the radiation-transmissive portions of the first mask 356, as shown by first arrows 358. The radiation may be blocked by the radiation-blocking portions of the first mask 356. A chemical structure of the first photoresist material 354 may be altered by exposure to the radiation and may become selectively removable (e.g., soluble) relative to the non-radiated portions of the first photoresist material 354.

Figure 9:
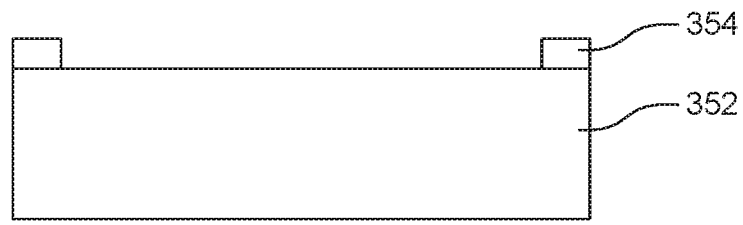

Referring to FIG. 9, the radiated portions of the first photoresist material 354 may be removed (e.g., developed). For example, the first photoresist material 354 may be a so-called positive photoresist material that becomes removable (e.g., soluble) by a developer solvent or other chemical after being radiated by a suitable radiation and that is not removable by the developer solvent or other chemical when not radiated, as is known in the art of photolithography. After the development, the drive body substrate material 352 that was underlying the radiated portions of the first photoresist material 354 may be exposed through the non-radiated portions of the first photoresist material 354. The exposed portions of the drive body substrate material 352 may be in a predetermined pattern (e.g., shape, size, number, etc.).

Figure 10:
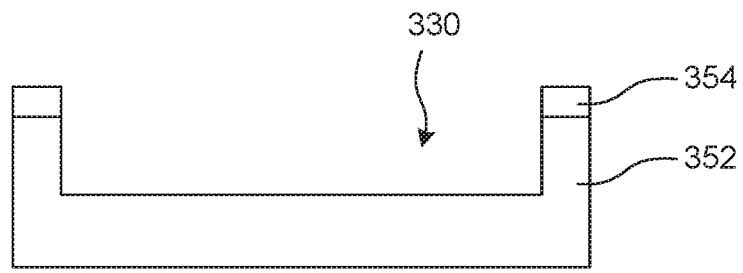

As shown in FIG. 10, the exposed portion of the drive body substrate material 352 may be removed to at least partially define an input gate terminal 330 in in the drive body substrate material 352. By way of example, an anisotropic material removal process (e.g., an etching process) may be performed to remove the exposed portion of the drive body substrate material 352. The material removal process may be selective to the drive body substrate material 352 relative to the remaining non-radiated portions of the first photoresist material 354.

Figure 11:
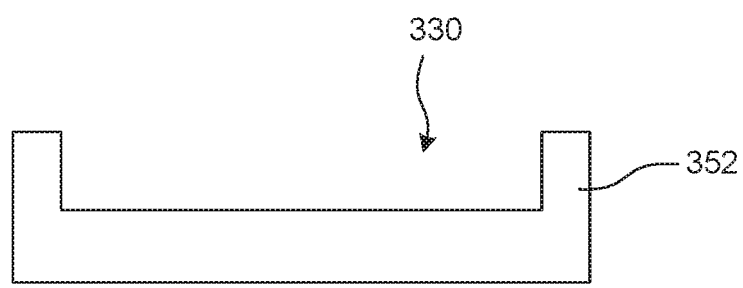

Referring to FIG. 11, the remaining first photoresist material 354 may be removed from the drive body substrate material 352, such as by an isotropic or anisotropic material removal process (e.g., a chemical etching process, an ion etching process, a grinding process, a chemical-mechanical planarization ("CMP") process, exposure to a solvent, etc.).

Figure 12:
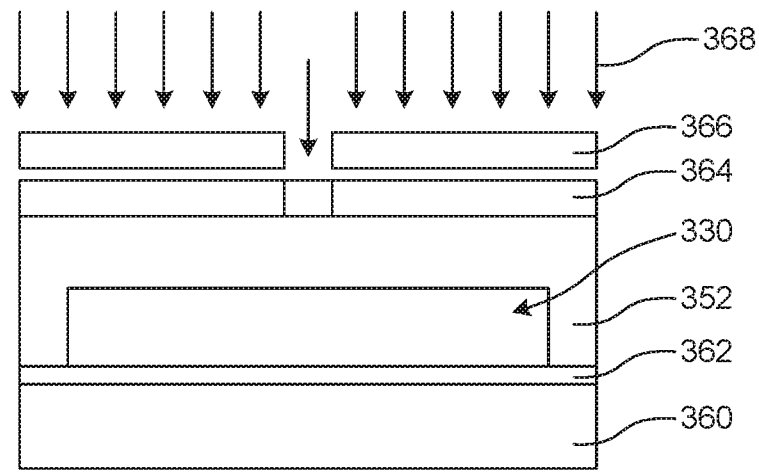

As shown in FIG. 12, a drive body carrier substrate 360 may be attached to the drive body substrate material 352 and over the input gate terminal 330 formed therein, such as via an adhesive material 362. The drive body substrate material 352 is shown in FIGS. 12-15 in an inverted orientation relative to FIGS. 6-11.

Still referring to FIG. 12, a second photoresist material 364 may be disposed over a surface of the drive body substrate material 352 opposite the input gate terminal 330. A second mask 366 may be positioned over the second photoresist material 364, and the second photoresist material 364 may be selectively radiated through the second mask 366, as shown by second arrows 368.

Figure 13:
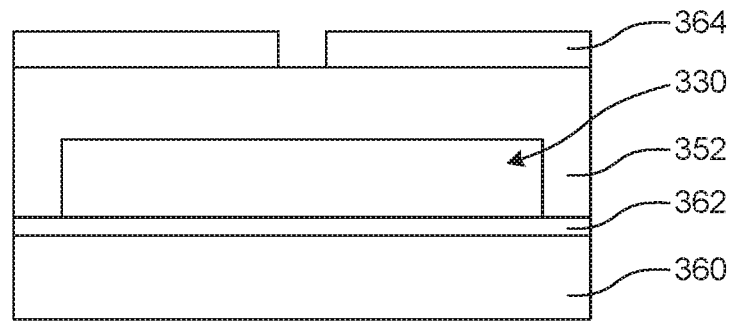

By way of example, the second photoresist material 364 may be a positive photoresist material, as explained above with reference to the first photoresist material 354. Thus, as shown in FIG. 13, the radiated portions of the second photoresist material 364 may be selectively removed (e.g., developed), and the non-radiated portions of the second photoresist material 364 may remain over the drive body substrate material 352.

Figure 14:
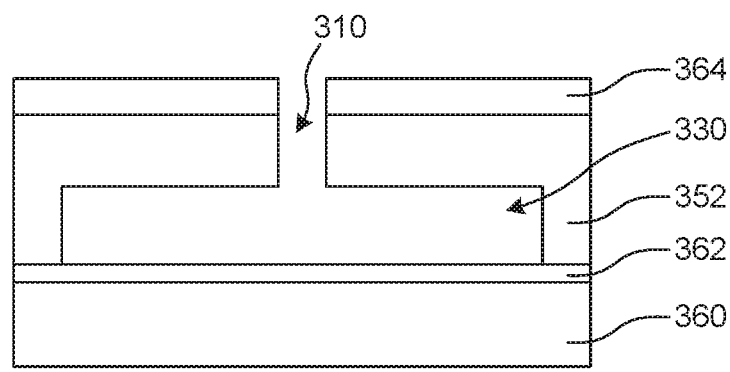

Referring to FIG. 14, portions of the drive body substrate material 352 that are exposed through the remaining portions of the second photoresist material 364 may be removed, such as with an anisotropic material removal process (e.g., an etching process) that is selective to the drive body substrate material 352 relative to the second photoresist material 364. This material removal process may form a gate port 310 in the drive body substrate material 352, which may be in fluid communication with the input gate terminal 330.

As shown in FIG. 15, the second photoresist material 364 and the drive body carrier substrate 360 may be removed (e.g., developed) from the drive body substrate material 352, and the drive body portion 344 may be defined by the resulting structure. The drive body portion 344 may include the gate port 310 and the input gate terminal 330. In embodiments in which multiple drive body portions 344 of multiple respective microfluidic valves 300 are to be formed, the multiple drive body portions 344 of a wafer or other bulk substrate may be separated from each other (e.g., diced) at this time or at a later time, as will be described further below.

Figure 16:
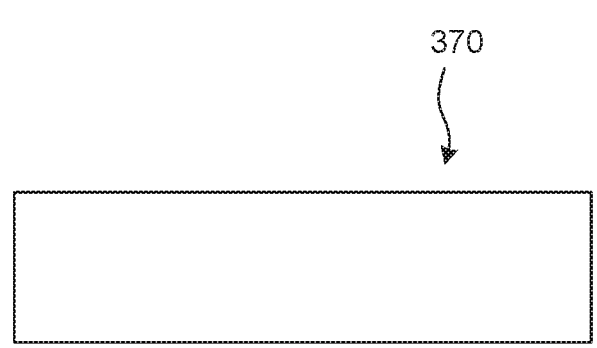
FIGS. 16-25 illustrate cross-sectional views of various stages of manufacture of a gate body portion of a microfluidic valve, according to at least one embodiment of the present disclosure.

As noted above, FIGS. 16-25 illustrate various stages of manufacture of the gate body portion 346. Referring to FIG. 16, a gate body substrate material 370 may be selected for processing to form the gate body portion 346 (shown in its completed state in FIG. 25). By way of example and not limitation, the gate body substrate material 370 may be or include a silicon material, a silicon dioxide material, a glass material, or a rigid polymer material. In some embodiments, the gate body substrate material 370 may be in the form of a wafer or other bulk substrate to be processed to include a plurality of gate body portions 346 of respective microfluidic valves 300 (FIG. 40).

Figure 17:

Referring to FIG. 17, a first etch stop material 372, such as silicon dioxide, may be formed over the gate body substrate material 370. By way of example and not limitation, the first etch stop material 372 may be formed by a chemical-vapor deposition ("CVD") process, a plasma-enhanced CVD ("PECVD") process, a diffusion process, etc.

Figure 18:
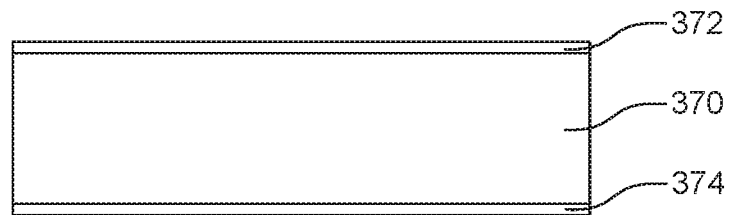

As shown in FIG. 18, a second etch stop material 374, such as silicon dioxide, may be formed on a surface of the gate body substrate material 370 opposite the first etch stop material 372. By way of example and not limitation, the second etch stop material 374 may be formed by a chemical-vapor deposition ("CVD") process, a plasma-enhanced CVD ("PECVD") process, a diffusion process, etc.

Figure 19:
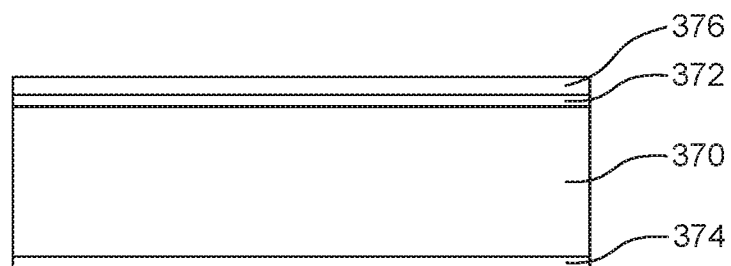

Referring to FIG. 19, a first flexible material 376 may be formed over the first etch stop material 372. The first flexible material 376 may be, for example, a polymer material (e.g., an elastomeric material, such as a polysiloxane material). In some examples, the first flexible material 376 may be chemically bonded to the first etch stop material 372, which may, in turn, be chemically bonded to the gate body substrate material 370. In some embodiments, prior to forming the first flexible material 376 over the first etch stop material 372, the first etch stop material 372 may be plasma treated, such as for improved bonding between the first flexible material 376 and the first etch stop material 372.

Figure 20:
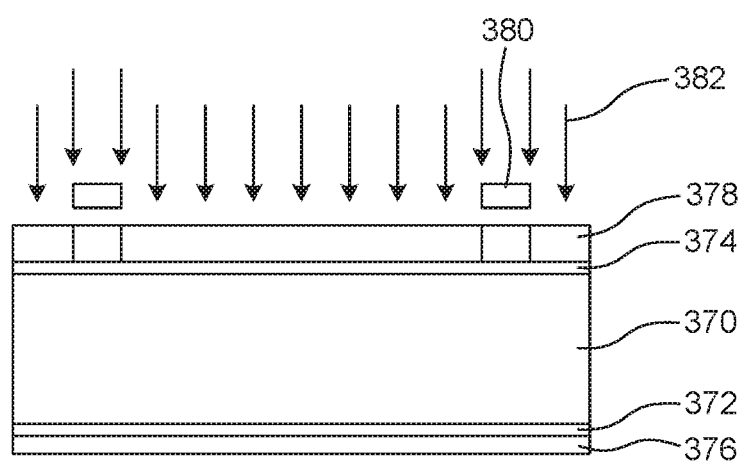

In FIG. 20, the gate body substrate material, first etch stop material 372, second etch stop material 374, and first flexible material 376 are shown in an inverted orientation relative to FIG. 19. A third photoresist material 378 may be formed over the second etch stop material 374, and a third mask 380 may be positioned over the third photoresist material 378. The third photoresist material 378 may be radiated through the third mask 380, as shown by third arrows 382.

Figure 21:
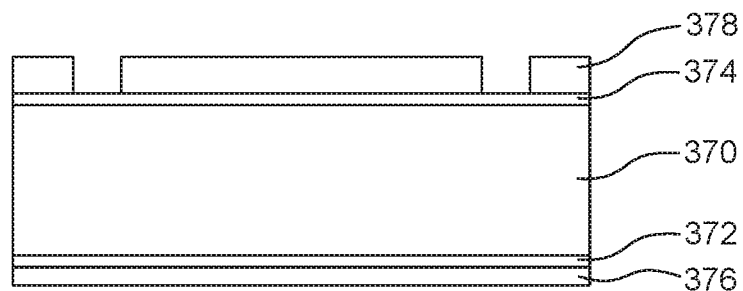

By way of example, the third photoresist material 378 may be a so-called negative photoresist material that is soluble in a developer when not radiated and that becomes insoluble in the developer when radiated. As shown in FIG. 21, the portions of third photoresist material 378 that were not radiated may be removed (e.g., developed) to expose underlying portions of the second etch stop material 374.

Figure 22:
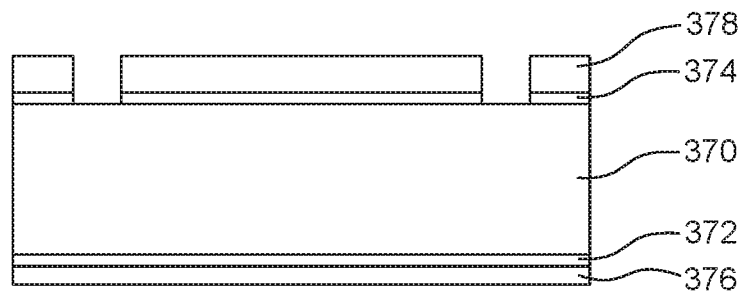

Referring to FIG. 22, the exposed portions of the second etch stop material 374 may be removed to expose underlying portions of the gate body substrate material 370.

Figure 23:
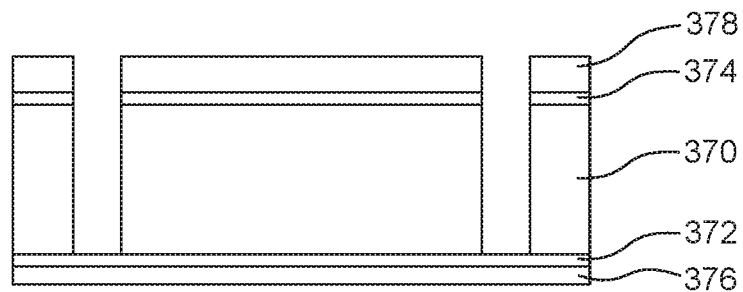

As shown in FIG. 23, the exposed portions of the gate body substrate material 370 may be removed, such as with an anisotropic material removal process (e.g., an etching process such as a dry reactive ion etching process) that is selective to the gate body substrate material 370 relative to the remaining portions of the third photoresist material 378, the first etch stop material 372, and/or the second etch stop material 374. This material removal process may form a trench in the gate body substrate material 370 and may expose portions of the first etch stop material 372 at a bottom of the trench.

In some embodiments, an optional exhaust outlet 324 (shown in FIG. 41) may be formed in conjunction with the material removal process(es) described with reference to FIGS. 21-23. For example, the third photoresist material 378 may be exposed to radiation through the third mask 380 and may be developed to form a pattern that includes the exhaust outlet 324. The pattern in the third photoresist material 378 may be transferred to the second etch stop material 374 and to the gate body substrate material 370 by the material removal processes described above to form both the trench and the exhaust outlet 324.

Figure 24:
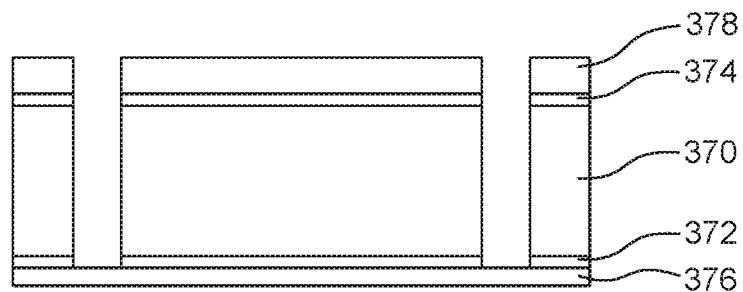

As shown in FIG. 24, the exposed portions of the first etch stop material 372 may then be removed from the bottom of the trench, such as by a material removal process that is selective to the first etch stop material 372 relative to the first flexible material 376. The material removal processes described with reference to FIGS. 21-24 may define an output gate terminal 332 and a plunger 316 within the output gate terminal 332.

Figure 25:
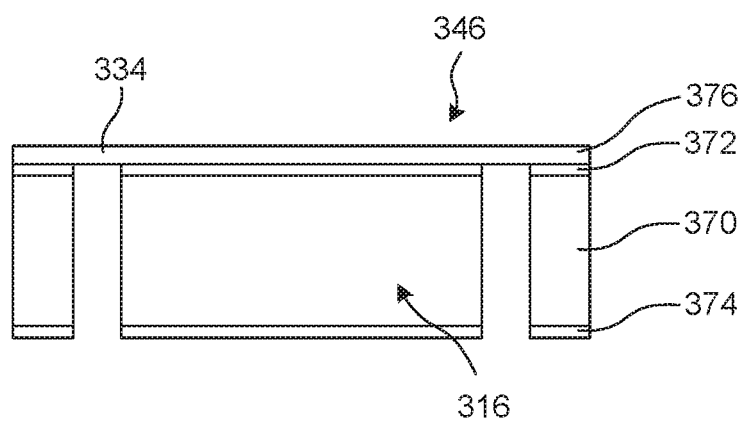

Referring to FIG. 25, the third photoresist material 378 may be removed, and the resulting structure may include the gate body portion 346 and the plunger 316. The plunger 316 may be physically separated from adjacent the adjacent gate body portion 346 by the output gate terminal 332. However, the plunger 316 may be coupled to the gate body portion 346 via the first flexible material 376, which may define a flexible membrane 334 spanning the output gate terminal 332. The first flexible material 376 may be chemically bonded to the gate body portion 346 and to the plunger 316. The plunger 316 and the flexible membrane 334 may together define a gate transmission element. In embodiments in which multiple gate body portions 346 of multiple respective microfluidic valves 300 are to be formed, the multiple gate body portions 346 of a wafer or other bulk substrate may be separated from each other (e.g., diced) at this time or at a later time, as will be described further below.

Figure 26:
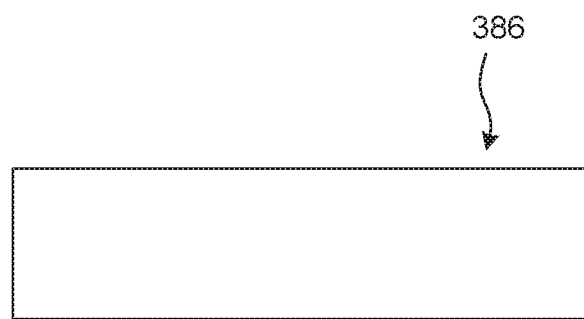
FIGS. 26-39 illustrate cross-sectional views of various stages of manufacture of a fluid channel body portion of a microfluidic valve, according to at least one embodiment of the present disclosure.

As noted above, FIGS. 26-39 illustrate various stages of manufacture of the fluid channel body portion 348. Referring to FIG. 26, a fluid channel body substrate material 386 may be selected for processing to form the fluid channel body portion 348 (shown in its completed state in FIG. 39). By way of example and not limitation, the fluid channel body substrate material 386 may be or include a silicon material, a silicon dioxide material, a glass material, or a rigid polymer material. In some embodiments, the fluid channel body substrate material 386 may be in the form of a wafer or other bulk substrate to be processed to include a plurality of fluid channel body portions 348 of respective microfluidic valves 300 (FIG. 40).

Figure 27:
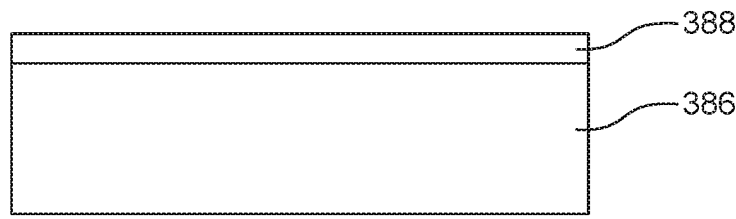

As shown in FIG. 27, a fourth photoresist material 388 may be disposed over a surface of the fluid channel body substrate material 386. By way of example, the fourth photoresist material 388 may be a negative photoresist material, as explained above with reference to the third photoresist material 378.

Figure 28:
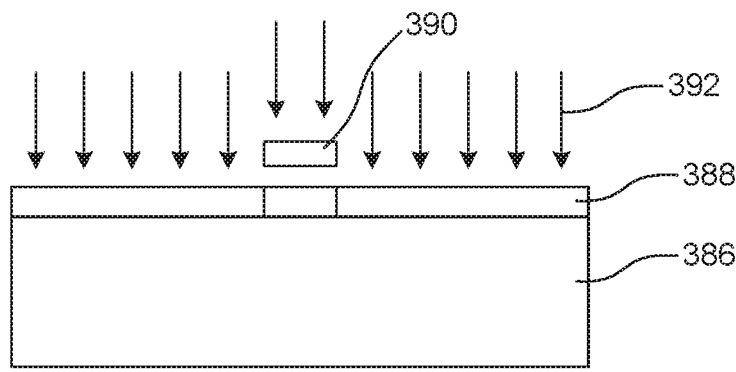

Referring to FIG. 28, a fourth mask 390 may be positioned over the fourth photoresist material 388 and radiation may be directed through the fourth mask 390 to exposed portions of the fourth photoresist material 388, as shown by fourth arrows 392 in FIG. 28.

Figure 29:
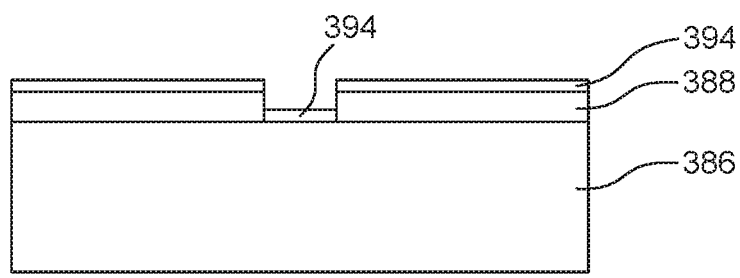

In FIG. 29, the portions of the fourth photoresist material 388 that were not radiated may be removed by a developer to selectively expose portions of the underlying fluid channel body substrate material 386. A metal material 394 may be deposited over the remaining fourth photoresist material 388 and exposed portions of the fluid channel body substrate material 386. By way of example, the metal material 394 may be deposited by a physical vapor deposition ("PVD") process, such as a sputtering process. The metal material 394 may be or include, for example, an aluminum material.

Figure 30:
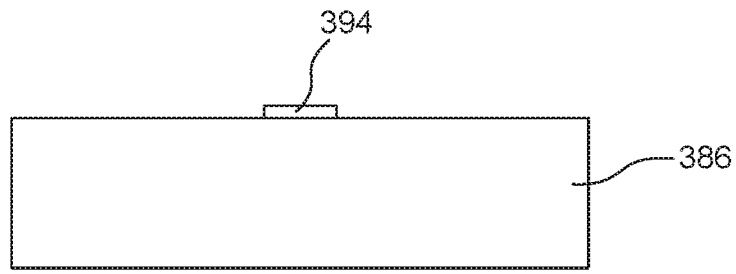

Referring to FIG. 30, the fourth photoresist material 388 and portions of the metal material 394 thereon may be removed, leaving a pattern of the metal material 394 on the fluid channel body substrate material 386. The remaining metal material 394 may form a landing pad against which a flexible bubble is to be pressed when blocking a restricting region in a fluid channel.

Figure 31:
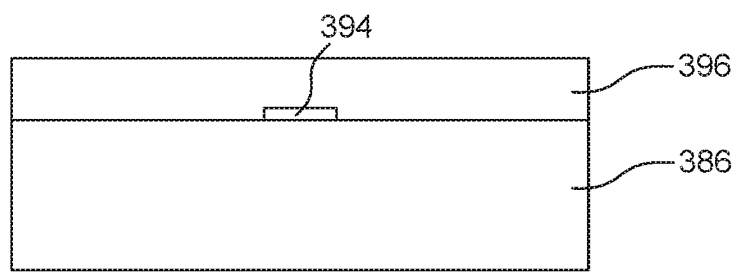
Figure 32:
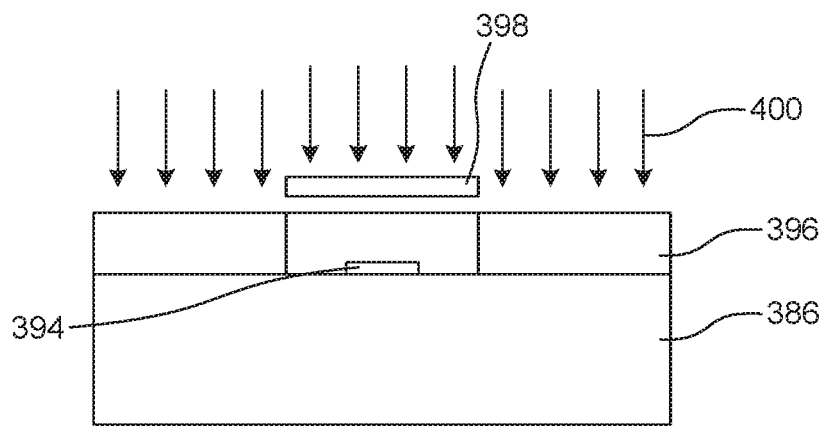

Referring to FIG. 31, a fifth photoresist material 396 may be disposed over the fluid channel body substrate material 386 and the metal material 394. The fifth photoresist material 396 may be a positive photoresist material, as described above with reference to the first photoresist material 354. A fifth mask 398 may be positioned over the fifth photoresist material 396, and the assembly may be radiated to selectively expose portions of the fifth photoresist material 396, as shown by fifth arrows 400.

Figure 33:
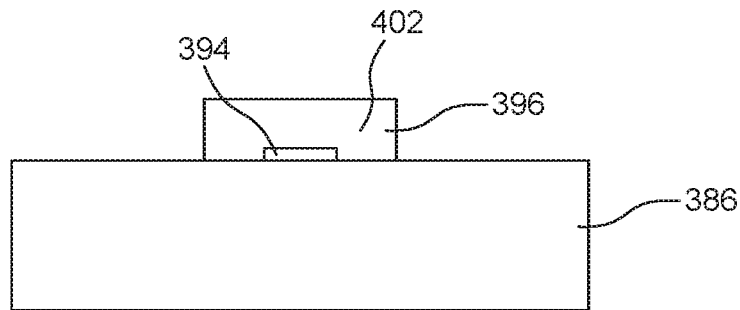

As shown in FIG. 33, the radiated portions of the fifth photoresist material 396 may be removed, leaving a block 402 of the fifth photoresist material 396 over the metal material 394 and adjacent portions of the fluid channel body substrate material 386.

Figure 34:
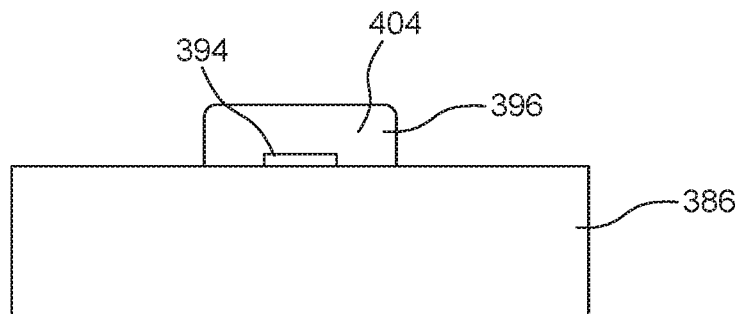

Referring to FIG. 34, the fifth photoresist material 396 may be heat treated to round upper corners of the block 402 of the fifth photoresist material 396, forming a rounded block 404. A temperature and time of the heat treatment may be selected based on the type of material making up the block 402, its physical reaction to the heat (e.g., level rounding of corners), and a desired profile of the resulting rounded block 404 after the heat treatment. The rounded block 404 may form a base structure over which a flexible bubble will be formed, as explained further below. Thus, the shape of the rounded block 404 may be selected based on a desired shape of the resulting flexible bubble.

Figure 35:
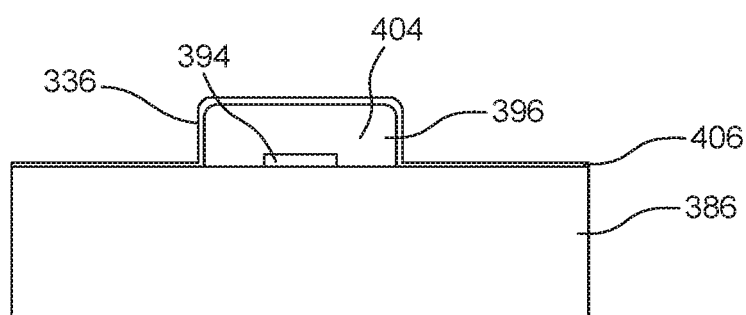

Referring to FIG. 35, a second flexible material 406 may be disposed over the fluid channel body substrate material 386 and over the rounded block 404. For example, the second flexible material 406 may be a polymer material (e.g., an elastomeric material, such as a polysiloxane material). The portion of the second flexible material 406 over the rounded block 404 may define a flexible bubble 336.

Figure 36:
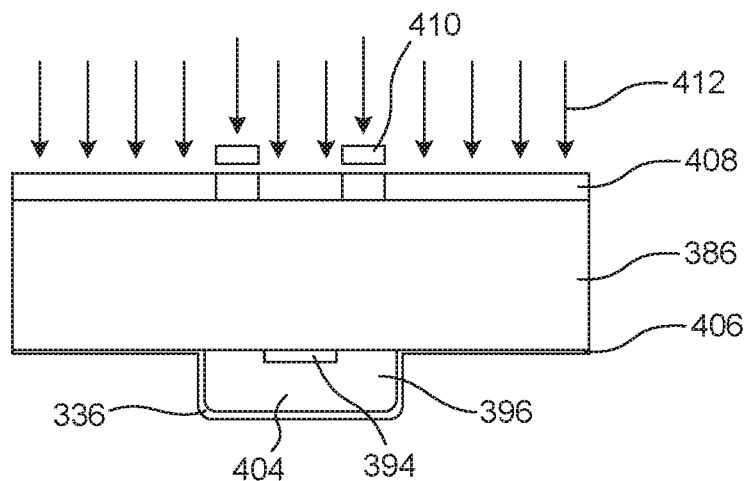
Figure 37:
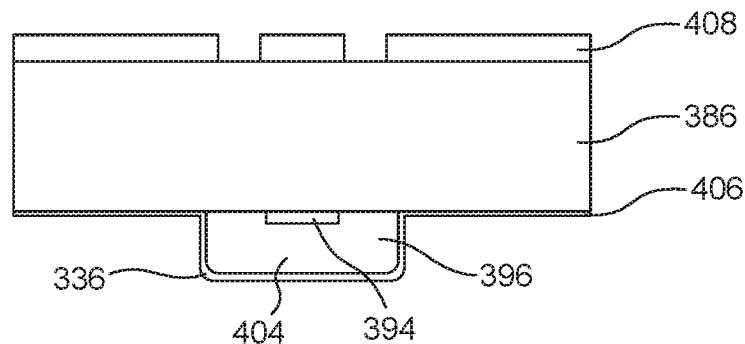
Figure 38:
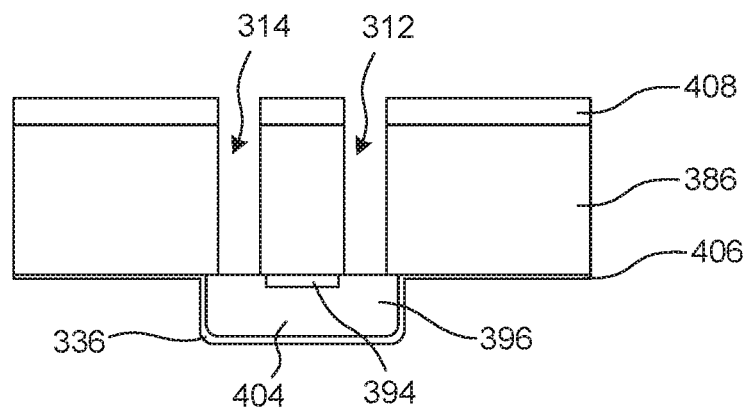

In FIGS. 36-38, the fluid channel body substrate material 386, metal material 394, rounded block 404 of the fifth photoresist material 396, and second flexible material 406 are illustrated in an inverted orientation relative to FIGS. 26-35.

Referring to FIG. 36, a sixth photoresist material 408 may be disposed over a surface of the fluid channel body substrate material 386 opposite the second flexible material 406. The sixth photoresist material 408 may be a negative photoresist material, as explained above with reference to the third photoresist material 378. A sixth mask 410 may be positioned over the sixth photoresist material 408. The sixth photoresist material 408 may be radiated through the sixth mask 410, as shown by sixth arrows 412 to transfer a pattern of the sixth mask 410 to the sixth photoresist material 408.

Referring to FIG. 37, the portion of the sixth photoresist material 408 that was not radiated may be removed to expose portions of the fluid channel body substrate material 386 through the remaining portions of the sixth photoresist material 408.

As shown in FIG. 38, the exposed portions of the fluid channel body substrate material 386 may be removed in an anisotropic material removal process, such as an etching process (e.g., a chemical etching process, a dry reactive ion etching process, etc.), as is known in the art of photolithography. This material removal process may form holes in the fluid channel body substrate material 386 that will define an inlet port 312 and an outlet port 314 in the resulting microfluidic valve 300 (see FIG. 40). The fifth photoresist material 396 of the rounded block 404 under the second flexible material 406 may be exposed through the inlet port 312 and outlet port 314.

Figure 39:
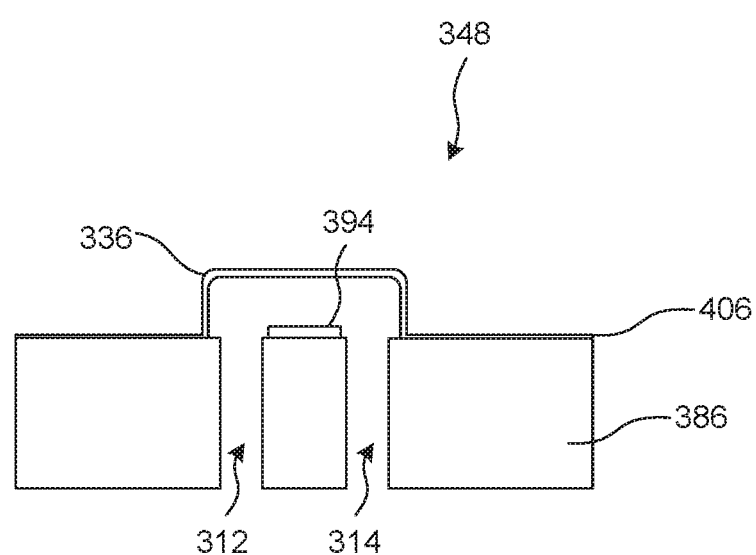

In FIG. 39, the structure is shown in an inverted orientation (i.e., in the same orientation as in FIGS. 26-35) relative to that shown in FIGS. 36-38. As shown in FIG. 39, the fifth photoresist material 396 of the rounded block 404 may be removed through the inlet port 312 and outlet port 314, such as by an isotropic material removal process (e.g., a wet etching process, a chemical etching process, etc.), as is known in the art of photolithography. At this point, the flexible bubble 336 and a restricting region 338 of a fluid channel between the inlet port 312 to the outlet port 314 may be formed and defined. In addition, the fluid channel body portion 348 may also be formed and defined. In embodiments in which multiple fluid channel body portions 348 of multiple respective microfluidic valves 300 are to be formed, the multiple fluid channel body portions 348 of a wafer or other bulk substrate may be separated from each other (e.g., diced) at this time or at a later time, as will be explained further below.

Next, the drive body portion 344 (FIG. 15), gate body portion 346 (FIG. 25), and fluid channel body portion 348 (FIG. 39) may be assembled and coupled to each other to form the microfluidic valve 300, as shown in FIG. 40. In some examples, individual units (e.g., dice) of the drive body portion 344, the gate body portion 346, and the fluid channel body portion 348 may be formed and individually assembled and coupled to each other to form one microfluidic valve 300. Alternatively, wafers or other bulk substrates respectively including multiple units of the drive body portion 344, the gate body portion 346, and the fluid channel body portion 348 may be aligned, assembled, and coupled to each other. Then, a plurality of the microfluidic valves 300 may be separated (e.g., cut, diced, etc.) from each other and simultaneously formed.

In some examples, the drive body portion 344, gate body portion 346, and fluid channel body portion 348 may be assembled and coupled to each other with an adhesive material. In additional examples, the drive body portion 344, gate body portion 346, and fluid channel body portion 348 may be assembled and coupled to each other via chemical bonding. For example, the drive body portion 344, gate body portion 346, and fluid channel body portion 348 may be pressed against each other and/or heat treated to form the chemical bond. One or more bonding agents may be applied at the interface(s) between the drive body portion 344, gate body portion 346, and fluid channel body portion 348 to facilitate forming a chemical bond between these components.

As shown in FIG. 40, upon assembly of the gate body portion 346 to the fluid channel body portion 348, the plunger 316 may be forced upward (relative to the perspective of FIG. 40) away from the fluid channel body portion 348 because of the structure of the flexible bubble 336. The flexible membrane 334 may stretch to enable the plunger 316 to be in the position shown in FIG. 40. In some embodiments, the structure of the flexible bubble 336 may be sufficient to hold the plunger 316 in this upward position in the absence of any applied fluid force or pressurization. In additional embodiments, the plunger 316 may be forced into the upward position (FIG. 40) upon pressurization of the inlet port 312, depressurization of the input gate terminal 330, and/or pressurization of the output gate exhaust chamber 340. When the plunger 316 is in the upward position illustrated in FIG. 40, the restricting region 338 may be unblocked, the microfluidic valve 300 may be in an open state, and subject fluid may flow from the inlet port 312 to the outlet port 314 (and ultimately to a fluid-driven mechanism).

In FIG. 41, the microfluidic valve 300 is illustrated in a closed state, with the plunger 316 in a downward (relative to the perspective of FIG. 41) position toward the fluid channel body portion 348. The plunger 316 may press against and deform the flexible bubble 336 to block the restricting region 338 (FIG. 40) between the inlet port 312 and the outlet port 314. The plunger 316 may move to this downward position upon sufficiently pressurizing the input gate terminal 330 through the gate port 310 and/or depressurizing the output gate exhaust chamber 340 through the exhaust outlet 324.

FIG. 41 also illustrates optional alignment marks 414 (shown in dashed lines) formed on surfaces of the drive body portion 344, gate body portion 346, and fluid channel body portion 348. The alignment marks 414 may optionally be formed during the manufacture of the respective drive body portion 344, gate body portion 346, and/or fluid channel body portion 348. For example, the alignment marks 414 may be formed by a printing (e.g., inkjet printing) process, an etching process, and/or a photolithography process. The alignment marks 414, if present, may facilitate aligning the drive body portion 344, gate body portion 346, and fluid channel body portion 348 for proper assembly thereof. Alternatively, other features formed in the drive body portion 344, gate body portion 346, and fluid channel body portion 348 may be used to facilitate alignment of these structures during assembly, such as edges of the input gate terminal 330, edges of the output gate terminal 332, the inlet port 312 and/or outlet port 314, etc.

FIG. 42 is a flow diagram illustrating a method 500 of controlling flow of a subject fluid in a microfluidic system, according to at least one embodiment of the present disclosure. At operation 510, a subject fluid may be conveyed through a restricting region of a fluid channel from an inlet port to an outlet port. For example, the restricting region may be within the output gate terminal and may be defined by an interior of a flexible bubble, as described above. In some examples, the fluid conveyed into the outlet port may be flowed to a fluid-driven mechanism to activate the fluid-driven mechanism. By way of non-limiting example, the fluid-driven mechanism may be a haptic feedback device of an artificial reality system.

At operation 520, a drive fluid may be flowed into an input gate terminal separated from an output gate terminal by a gate transmission element (e.g., a flexible membrane coupled to a plunger). For example, the drive fluid may be introduced into the input gate terminal from a drive fluid source via a gate port, as described above.

At operation 530, the gate transmission element may be moved to press against and to deform a flexible bubble positioned within the output gate terminal. The output gate terminal may be separated from the restricting region by the flexible bubble. For example, the gate transmission element may be moved responsive to the drive fluid flowing into the input gate terminal.

At operation 540, flow of the subject fluid from the inlet port to the outlet port may be inhibited by blocking the restricting region with the deformed flexible bubble. For example, the restricting region may be contracted by the deformation of the flexible bubble, as described above. In this manner, the microfluidic valve may be operated to a closed state. If the microfluidic valve is desired to be operated to an open state from the closed state, the method 500 may also include withdrawing drive fluid from the input gate terminal through the gate port to move the gate transmission element to relieve pressure against the flexible bubble and to unblock the restricting region.

FIGS. 43 and 44 are flow diagrams illustrating methods 600 and 700 of fabricating microfluidic systems, respectively according to at least one embodiment of the present disclosure.

Referring to FIG. 43, the method 600 may include an operation 610 of forming a cavity within a microfluidic valve body, which may be or include at least one of a silicon material, a silicon dioxide material, a glass material, or a rigid polymer material. For example, as described above, an input gate terminal may be formed within a drive body portion of the microfluidic valve body, and an output gate terminal may be formed within a gate body portion of the microfluidic valve body. At least one photolithography operation may be performed to form the cavity within the microfluidic valve body. The cavity may be formed to have a cross-sectional area of about 25 mm$^2$ or less, such as about 1 mm$^2$ or less.

At operation 620, a gate transmission element may be positioned within the cavity to separate the input gate terminal from the output gate terminal, such as by disposing a flexible membrane on a surface of the gate body portion and coupling a plunger to the flexible membrane. The gate body portion and the drive body portion may be coupled to each other.

In some embodiments, a fluid channel body portion may be coupled to the gate body portion on an opposite side of the gate body portion from the drive body portion.

At operation 630, a fluid channel may be formed to include an inlet port, a restricting region, and an outlet port within the microfluidic valve body. The gate transmission element may be positioned and configured to move back and forth upon pressurization and depressurization of the input gate terminal to restrict the restricting region to inhibit the flow of a subject fluid from the inlet port to the outlet port upon pressurization of the input gate terminal. Similarly, the gate transmission element may be configured to move back and forth to allow or increase the flow of subject fluid from the inlet port to the outlet port upon depressurization of the input gate terminal. A flexible bubble may separate the restricting region from an output gate exhaust chamber of the output gate terminal. Thus, the flexible bubble may be formed over the restricting region and positioned within the output gate terminal. An exhaust outlet may be formed in the microfluidic valve body in fluid communication with the output gate exhaust chamber.

Referring to FIG. 44, the method 700 of fabricating a microfluidic system may include forming a microfluidic valve, as shown at operation 710. The microfluidic valve may be formed as described above. For example, material may be removed (e.g., by performing at least one photolithography operation) from a drive body portion of a microfluidic valve body to form an input gate terminal and a gate port into the input gate terminal. A flexible membrane may be formed on a gate body portion of the microfluidic valve body. For example, the flexible membrane may be or include a polymer material (e.g., an elastomeric material, such as a polysiloxane material). Material may be removed (e.g., by performing at least one photolithography operation) from the gate body portion to form an output gate terminal and to define a plunger within the output gate terminal. The plunger may be bonded to the flexible membrane but may be otherwise separated from the gate body portion. A flexible bubble may be formed on a fluid channel body portion of the microfluidic valve body, and material may be removed (e.g., by performing at least one photolithography operation) from the fluid channel body portion to form an inlet port and an outlet port. The inlet port and the outlet port may be in fluid communication with an interior of the flexible bubble. The drive body portion may be coupled to the gate body portion. The input gate terminal may be separated from the output gate terminal with the flexible membrane. The gate body portion may be coupled to the fluid channel body portion.

In some examples, forming the microfluidic valve may include simultaneously forming a plurality of microfluidic valves. Coupling the drive body portion to the gate body portion may include bonding a drive body substrate material including a plurality of drive body portions to a gate body substrate material including a plurality of gate body portions. Coupling the gate body portion to the fluid channel body portion may include bonding the gate body substrate material including the plurality of gate body portions to a fluid channel body substrate material including a plurality of fluid channel body portions. The plunger may be abutted against the flexible bubble after the gate body portion is coupled to the fluid channel body portion.

In some examples, forming the flexible bubble on the fluid channel body may include forming a block on the fluid channel body portion. The block may be rounded, such as by heat treating the block. A flexible material (e.g., an elastomeric material, such as a polysiloxane material) may be formed over the block and the fluid channel body portion. The block may be removed while leaving the flexible material to remain on the fluid channel body portion. For example, the block may be removed by removing a material of the block through at least one of the inlet port or the outlet port using a selective material removal process. The flexible bubble may be formed to have a surface area that is smaller than a surface area of the flexible membrane, such as to provide a mechanical advantage for operating the microfluidic valve.

At operation 720, a drive fluid source may be operably coupled to the gate port of the microfluidic valve. For example, the drive fluid source may be or include a pressurized reservoir, a fan, a pump, or a piston system, etc., that may be placed in fluid communication with the gate port.

At operation 730, a subject fluid source may be operably coupled to the inlet port of the microfluidic valve (e.g., of the fluid channel). For example, the subject fluid source may be or include a pressurized reservoir, a fan, a pump, or a piston system, etc., that may be placed in fluid communication with the inlet port.

At operation 740, a fluid-driven mechanism may be operably coupled to the outlet port of the microfluidic valve (e.g., of the fluid channel). The fluid-driven mechanism may be operated by the subject fluid when the microfluidic valve is in an open state. For example, the fluid-driven mechanism may include at least one of a MEMS device, an expansible cavity, a piston system, and/or a haptic feedback device.

Accordingly, disclosed are microfluidic valves and related systems and methods for controlling flow of a fluid. The microfluidic valves may include a valve body with at least one cavity therein and a gate transmission element dividing the cavity into an input gate terminal and an output gate terminal. The gate transmission element may include a plunger coupled to a flexible membrane. The gate transmission element may be configured to move within the cavity to inhibit subject fluid flow from an inlet port to an outlet port of a fluid channel upon pressurization of the input gate terminal, and to allow subject fluid flow upon depressurization of the input gate terminal. The disclosed concepts may provide improved architectures and methods that enable and facilitate the control of fluid flow at a microfluidic scale.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality, a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is an artificial reality system 800 in FIG. 45. Other artificial reality systems may include an NED that also provides visibility into the real world (e.g., an artificial reality system 900 in FIG. 46) or that visually immerses a user in an artificial reality (e.g., a VR system 1000 in FIG. 47). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 45:
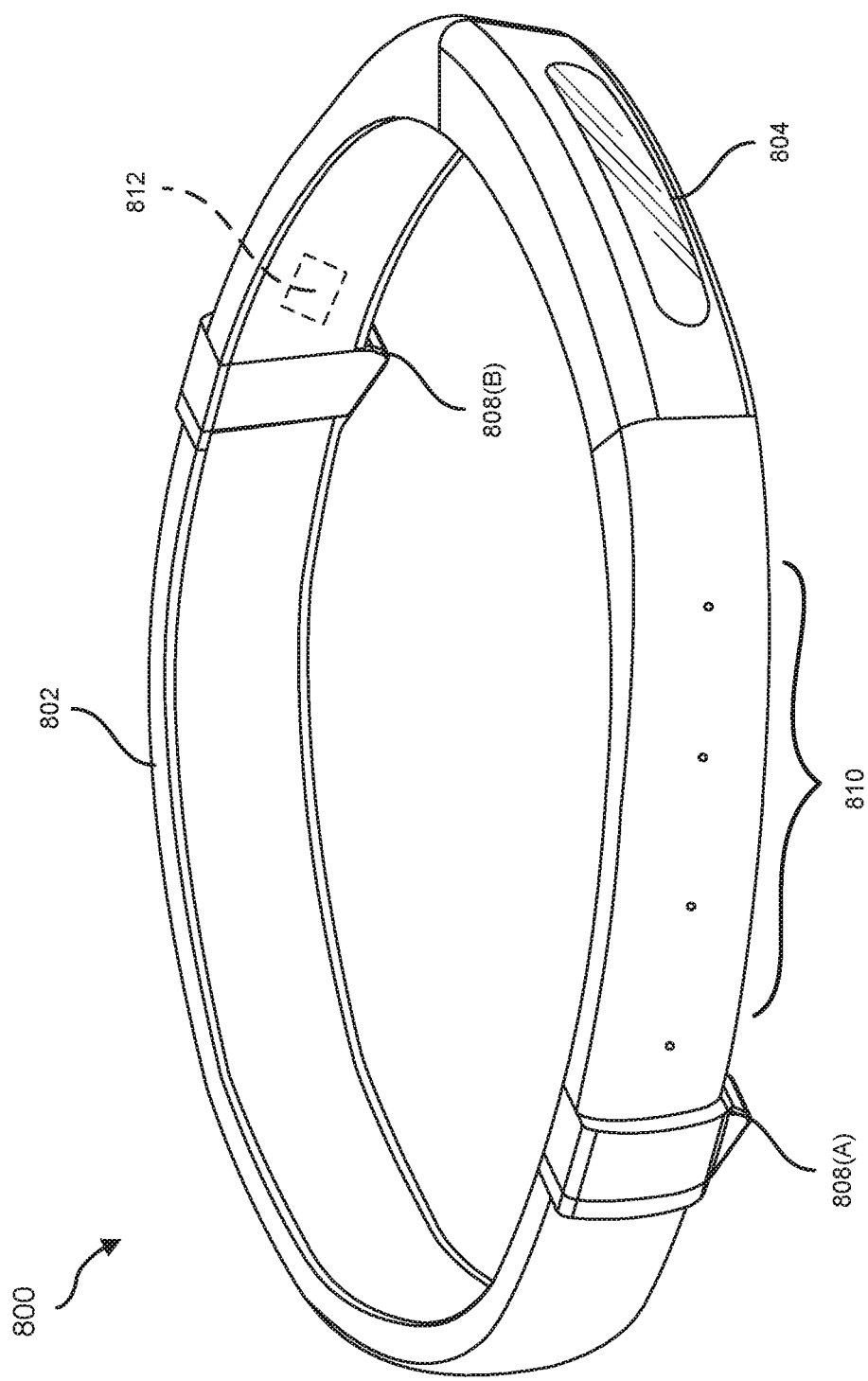
FIG. 45 is an illustration of an example artificial-reality headband that may be used in connection with embodiments of this disclosure.

Turning to FIG. 45, the artificial reality system 800 generally represents a wearable device dimensioned to fit about a body part (e.g., a head) of a user. As shown in FIG. 45, the artificial reality system 800 may include a frame 802 and a camera assembly 804 that is coupled to the frame 802 and configured to gather information about a local environment by observing the local environment. The artificial reality system 800 may also include one or more audio devices, such as output audio transducers 808(A) and 808(B) and input audio transducers 810. The output audio transducers 808(A) and 808(B) may provide audio feedback and/or content to a user, and the input audio transducers 810 may capture audio in a user's environment.

As shown, the artificial reality system 800 may not necessarily include an NED positioned in front of a user's eyes. Artificial reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While the artificial reality system 800 may not include an NED, the artificial reality system 800 may include other types of screens or visual feedback devices (e.g., a display screen integrated into a side of the frame 802). The artificial reality system 800 may include one or more haptic feedback devices 812, which may be or include the fluidic system 10 of FIG. 1 and/or the microfluidic system 100 of FIG. 2.

Figure 46:
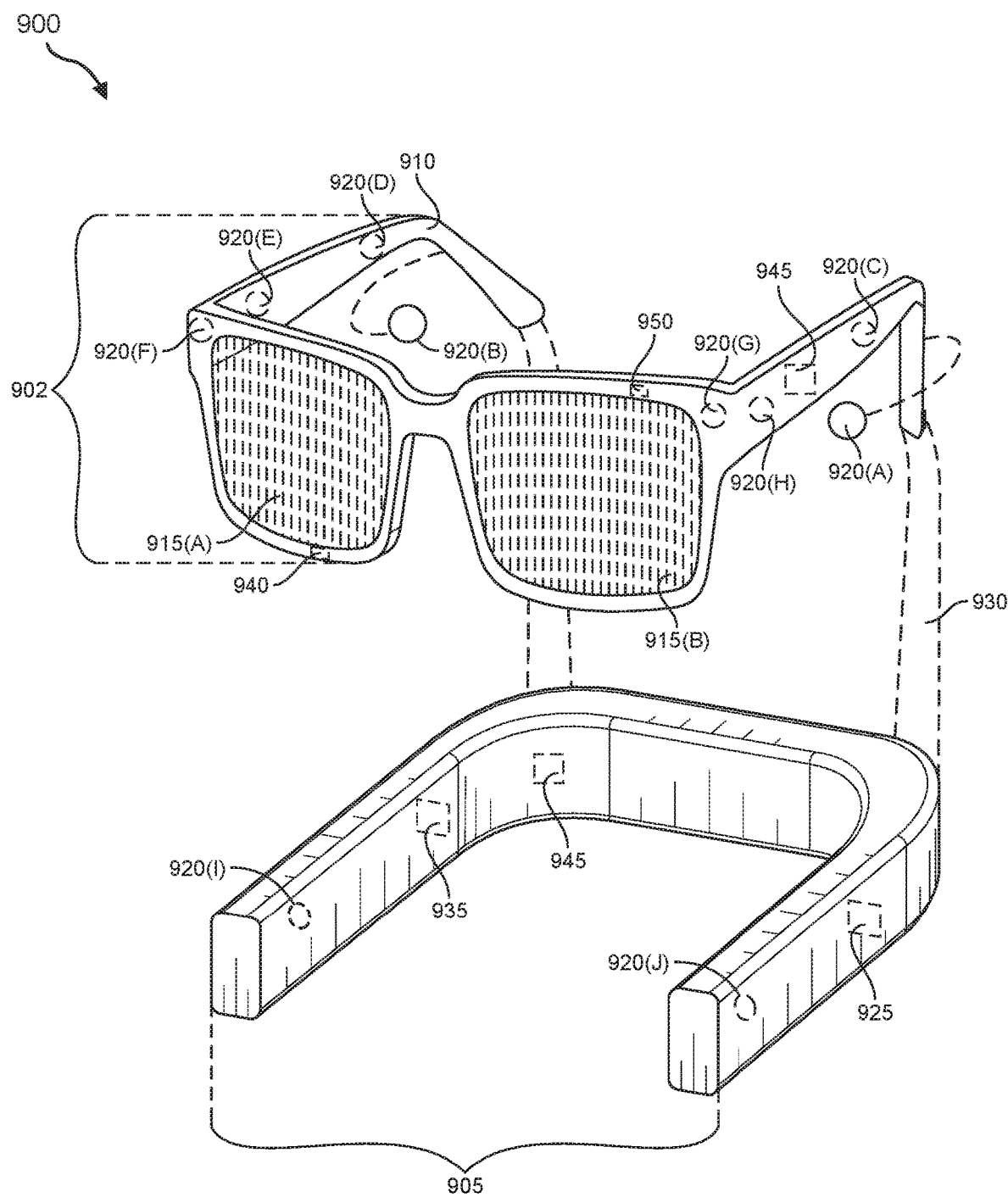
FIG. 46 is an illustration of example augmented-reality glasses that may be used in connection with embodiments of this disclosure.

The embodiments discussed in this disclosure may also be implemented in artificial reality systems that include one or more NEDs. For example, as shown in FIG. 46, the artificial reality system 900 may include an eyewear device 902 with a frame 910 configured to hold a left display device 915(A) and a right display device 915(B) in front of a user's eyes. The display devices 915(A) and 915(B) may act together or independently to present an image or series of images to a user. While the artificial reality system 900 is illustrated as including two displays, embodiments of this disclosure may be implemented in artificial reality systems with a single NED or more than two NEDs.

In some embodiments, the artificial reality system 900 may include one or more sensors, such as a sensor 940. The sensor 940 may generate measurement signals in response to motion of the artificial reality system 900 and may be located on substantially any portion of the frame 910. The sensor 940 may include a position sensor, an inertial measurement unit (IMU), a depth camera assembly, or any combination thereof. In some embodiments, the artificial reality system 900 may or may not include the sensor 940 or may include more than one sensor. In embodiments in which the sensor 940 includes an IMU, the IMU may generate calibration data based on measurement signals from the sensor 940. Examples of the sensor 940 may include, without limitation, accelerometers, gyroscopes, magnetometers, other suitable types of sensors that detect motion, sensors used for error correction of the IMU, or some combination thereof.

The artificial reality system 900 may also include a microphone array with a plurality of acoustic sensors 920 (A)-920(J), referred to collectively as acoustic sensors 920. The acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 46 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on the frame 910, and/or acoustic sensors 920(I) and 920(J), which may be positioned on a corresponding neckband 905.

The configuration of acoustic sensors 920 of the microphone array may vary. While the artificial reality system 900 is shown in FIG. 46 as having ten acoustic sensors 920, the number of acoustic sensors 920 may be greater or less than ten. In some embodiments, using higher numbers of acoustic sensors 920 may increase the amount of audio information collected and/or the sensitivity and accuracy of the audio information. In contrast, using a lower number of acoustic sensors 920 may decrease the computing power required by the controller 950 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

The acoustic sensors 920(A) and 920(B) may be positioned on different parts of the user's ear, such as behind the pinna or within the auricle or fossa. Or, there may be additional acoustic sensors on or surrounding the ear in addition to the acoustic sensors 920 inside the ear canal. Having an acoustic sensor positioned next to an ear canal of a user may enable the microphone array to collect information on how sounds arrive at the ear canal. By positioning at least two of the acoustic sensors 920 on either side of a user's head (e.g., as binaural microphones), the artificial reality device 900 may simulate binaural hearing and capture a 3D stereo sound field around about a user's head. In some embodiments, the acoustic sensors 920(A) and 920(B) may be connected to the artificial reality system 900 via a wired connection, and in other embodiments, the acoustic sensors 920(A) and 920(B) may be connected to the artificial reality system 900 via a wireless connection (e.g., a Bluetooth connection). In still other embodiments, the acoustic sensors 920(A) and 920(B) may not be used at all in conjunction with the artificial reality system 900.

The acoustic sensors 920 on the frame 910 may be positioned along the length of the temples, across the bridge, above or below the display devices 915(A) and 915(B), or some combination thereof. The acoustic sensors 920 may be oriented such that the microphone array is able to detect sounds in a wide range of directions surrounding the user wearing the artificial reality system 900. In some embodiments, an optimization process may be performed during manufacturing of the artificial reality system 900 to determine relative positioning of each acoustic sensor 920 in the microphone array.

The artificial reality system 900 may further include or be connected to an external device (e.g., a paired device), such as neckband 905. As shown, the neckband 905 may be coupled to the eyewear device 902 via one or more connectors 930. The connectors 930 may be wired or wireless connectors and may include electrical and/or non-electrical (e.g., structural) components. In some cases, the eyewear device 902 and the neckband 905 may operate independently without any wired or wireless connection between them. While FIG. 46 illustrates the components of the eyewear device 902 and the neckband 905 in example locations on the eyewear device 902 and the neckband 905, the components may be located elsewhere and/or distributed differently on the eyewear device 902 and/or the neckband 905. In some embodiments, the components of the eyewear device 902 and the neckband 905 may be located on one or more additional peripheral devices paired with the eyewear device 902, the neckband 905, or some combination thereof. Furthermore, the neckband 905 generally represents any type or form of paired device. Thus, the following discussion of the neckband 905 may also apply to various other paired devices, such as smart watches, smart phones, wrist bands, other wearable devices, hand-held controllers, tablet computers, laptop computers, etc.

Pairing external devices, such as the neckband 905, with artificial reality eyewear devices may enable the eyewear devices to achieve the form factor of a pair of glasses while still providing sufficient battery and computation power for expanded capabilities. Some or all of the battery power, computational resources, and/or additional features of the artificial reality system 900 may be provided by a paired device or shared between a paired device and an eyewear device, thus reducing the weight, heat profile, and form factor of the eyewear device overall while still retaining desired functionality. For example, the neckband 905 may allow components that would otherwise be included on an eyewear device to be included in the neckband 905 since users may tolerate a heavier weight load on their shoulders than they would tolerate on their heads or faces. The neckband 905 may also have a larger surface area over which to diffuse and disperse heat to the ambient environment. Thus, the neckband 905 may allow for greater battery and computation capacity than might otherwise have been possible on a stand-alone eyewear device. Since weight carried in the neckband 905 may be less invasive to a user than weight carried in the eyewear device 902, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

The neckband 905 may be communicatively coupled with the eyewear device 902 and/or to other devices. The other devices may provide certain functions (e.g., tracking, localizing, depth mapping, processing, storage, haptic feedback, etc.) to the artificial reality system 900. In the embodiment of FIG. 46, the neckband 905 may include two acoustic sensors (e.g., 920(I) and 920(J)) that are part of the microphone array (or potentially form their own microphone subarray). The neckband 905 may also include a controller 925 and a power source 935.

The acoustic sensors 920(I) and 920(J) of the neckband 905 may be configured to detect sound and convert the detected sound into an electronic format (analog or digital). In the embodiment of FIG. 46, the acoustic sensors 920(I) and 920(J) may be positioned on or in the neckband 905, thereby increasing the distance between the neckband acoustic sensors 920(I) and 920(J) and other acoustic sensors 920 positioned on eyewear device 902. In some cases, increasing the distance between the acoustic sensors 920 of the microphone array may improve the accuracy of beamforming performed via the microphone array. For example, if a sound is detected by the acoustic sensors 920(C) and 920(D) and the distance between the acoustic sensors 920(C) and 920 (D) is greater than, e.g., the distance between acoustic sensors 920(D) and 920(E), the determined source location of the detected sound may be more accurate than if the sound had been detected by the acoustic sensors 920(D) and 920(E).

The controller 925 of the neckband 905 may process information generated by the sensors on the neckband 905 and/or the artificial reality system 900. For example, the controller 925 may process information from the microphone array that describes sounds detected by the microphone array. For each detected sound, the controller 925 may perform a DoA estimation to estimate a direction from which the detected sound arrived at the microphone array. As the microphone array detects sounds, the controller 925 may populate an audio data set with the information. In embodiments in which the artificial reality system 900 includes an inertial measurement unit, the controller 925 may compute all inertial and spatial calculations from the IMU located on the eyewear device 902. The connector 930 may convey information between the artificial reality system 900 and the neckband 905 and between the artificial reality system 900 and the controller 925. The information may be in the form of optical data, electrical data, wireless data, or any other transmittable data form. Moving the processing of information generated by the artificial reality system 900 to the neckband 905 may reduce weight and heat in the eyewear device 902, making it more comfortable to the user.

The power source 935 in the neckband 905 may provide power to the eyewear device 902 and/or to the neckband 905. The power source 935 may include, without limitation, lithium ion batteries, lithium-polymer batteries, primary lithium batteries, alkaline batteries, or any other form of power storage. In some cases, the power source 935 may be a wired power source. Including the power source 935 on the neckband 905 instead of on the eyewear device 902 may help better distribute the weight and heat generated by the power source 935.

The artificial reality system 900 may include one or more haptic feedback devices 945, which may be or include the fluidic system 10 of FIG. 1 and/or the microfluidic system 100 of FIG. 2. The haptic feedback devices 945 may be incorporated in the eyewear device 902 to provide haptic feedback to a user's head or face, and/or may be incorporated in the neckband 905 or another wearable device (e.g., a glove, a headband, an armband, etc.) to provide haptic feedback to a user's neck or another body part.

As noted, some artificial reality systems may, instead of blending an artificial reality with actual reality, substantially replace one or more of a user's sensory perceptions of the real world with a virtual experience. One example of this type of system is a head-worn display system, such as the VR system 1000 in FIG. 47, that mostly or completely covers a user's field of view. The VR system 1000 may include a front rigid body 1002 and a band 1004 shaped to fit around a user's head. The VR system 1000 may also include output audio transducers 1006(A) and 1006(B). One or more haptic feedback devices 1008, which may be or include the fluidic system 10 of FIG. 1 and/or the microfluidic system 100 of FIG. 2, may also be included in the VR system 1000, such as (but not limited to) in or on the band 1004. Furthermore, while not shown in FIG. 47, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in the artificial reality system 900 and/or in the VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in the artificial reality system 900 and/or in the VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, the artificial reality system 800, the artificial reality system 900, and/or the VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 45 and 47, the output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, the input audio transducers 810 may include condenser microphones, dynamic microphones, ribbon microphones, and/or any other type or form of input transducer. In some embodiments, a single transducer may be used for both audio input and audio output.

Figure 47:
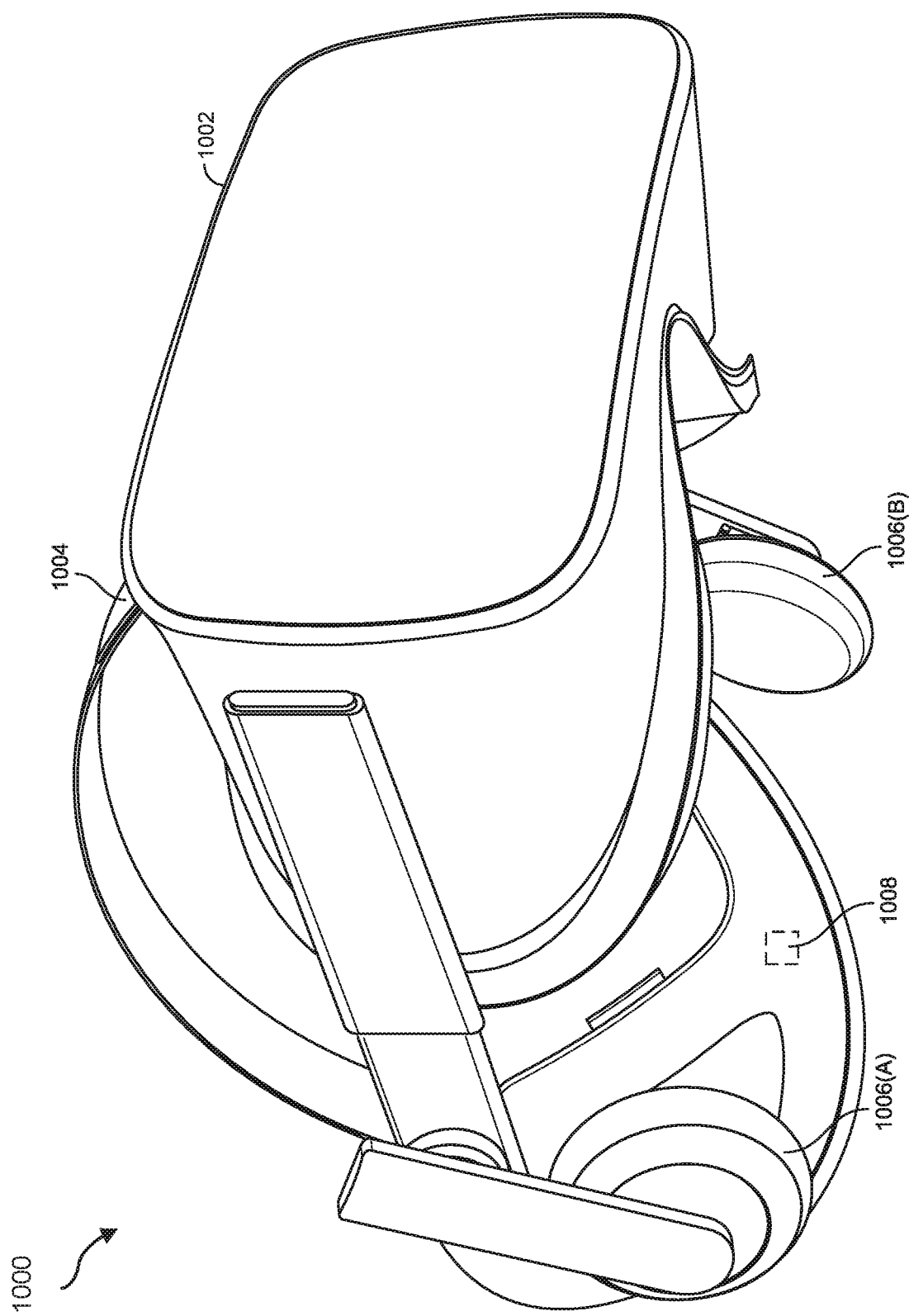
FIG. 47 is an illustration of an example virtual-reality headset that may be used in connection with embodiments of this disclosure.

While not shown in FIGS. 45-47, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As noted, the artificial reality systems 800, 900, and 1000 may be used with a variety of other types of devices to provide a more compelling artificial reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 48 illustrates a vibrotactile system 4800 in the form of a wearable glove (haptic device 4810) and wristband (haptic device 4820). The haptic device 4810 and haptic device 4820 are shown as examples of wearable devices that include a flexible, wearable textile material 4830 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 4840 may be positioned at least partially within one or more corresponding pockets formed in the textile material 4830 of the vibrotactile system 4800. The vibrotactile devices 4840 may be positioned in locations to provide a vibrating sensation (e.g., haptic feedback) to a user of the vibrotactile system 4800. For example, the vibrotactile devices 4840 may be positioned to be against the user's finger(s), thumb, or wrist, as shown in FIG. 48. The vibrotactile devices 4840 may, in some examples, be sufficiently flexible to conform to or bend with the user's corresponding body part(s).

A power source 4850 (e.g., a battery) for applying a voltage to the vibrotactile devices 4840 for activation thereof may be electrically coupled to the vibrotactile devices 4840, such as via conductive wiring 4852. In some examples, each of the vibrotactile devices 4840 may be independently electrically coupled to the power source 4850 for individual activation. In some embodiments, a processor 4860 may be operatively coupled to the power source 4850 and configured (e.g., programmed) to control activation of vibrotactile devices 4840.

The vibrotactile system 4800 may be implemented in a variety of ways. In some examples, the vibrotactile system 4800 may be a standalone system with integral subsystems and components for operation independent of other devices and systems. As another example, the vibrotactile system 4800 may be configured for interaction with another device or system 4870. For example, the vibrotactile system 4800 may, in some examples, include a communications interface 4880 for receiving and/or sending signals to the other device or system 4870. The other device or system 4870 may be a mobile device, a gaming console, an artificial reality (e.g., virtual reality, augmented reality, mixed reality) device, a personal computer, a tablet computer, a network device (e.g., a modem, a router, etc.), a handheld controller, etc. The communications interface 4880 may enable communications between the vibrotactile system 4800 and the other device or system 4870 via a wireless (e.g., Wi-Fi, Bluetooth, cellular, radio, etc.) link or a wired link. If present, the communications interface 4880 may be in communication with the processor 4860, such as to provide a signal to the processor 4860 to activate or deactivate one or more of the vibrotactile devices 4840.

The vibrotactile system 4800 may optionally include other subsystems and components, such as touch-sensitive pads 4890, pressure sensors, motion sensors, position sensors, lighting elements, and/or user interface elements (e.g., an on/off button, a vibration control element, etc.). During use, the vibrotactile devices 4840 may be configured to be activated for a variety of different reasons, such as in response to the user's interaction with user interface elements, a signal from the motion or position sensors, a signal from the touch-sensitive pads 4890, a signal from the pressure sensors, a signal from the other device or system 4870, etc.

Although the power source 4850, processor 4860, and communications interface 4880 are illustrated in FIG. 48 as being positioned in the haptic device 4820, the present disclosure is not so limited. For example, one or more of the power source 4850, processor 4860, or communications interface 4880 may be positioned within the haptic device 4810 or within another wearable textile.

Haptic wearables, such as those shown in and described in connection with FIG. 48, may be implemented in a variety of types of artificial-reality systems and environments. FIG. 49 shows an example artificial reality environment 4900 including one head-mounted virtual-reality display and two haptic devices (i.e., gloves), and in other embodiments any number and/or combination of these components and other components may be included in an artificial reality system. For example, in some embodiments there may be multiple head-mounted displays each having an associated haptic device, with each head-mounted display and each haptic device communicating with the same console, portable computing device, or other computing system.

A head-mounted display 4902 generally represents any type or form of virtual-reality system, such as a virtual-reality system 4700 in FIG. 47. A haptic device 4904 generally represents any type or form of wearable device, worn by a use of an artificial reality system, that provides haptic feedback to the user to give the user the perception that he or she is physically engaging with a virtual object. In some embodiments, the haptic device 4904 may provide haptic feedback by applying vibration, motion, and/or force to the user. For example, the haptic device 4904 may limit or augment a user's movement. To give a specific example, the haptic device 4904 may limit a user's hand from moving forward so that the user has the perception that his or her hand has come in physical contact with a virtual wall. In this specific example, one or more actuators within the haptic advice may achieve the physical-movement restriction by pumping fluid into an inflatable bladder of the haptic device. In some examples, a user may also use the haptic device 4904 to send action requests to a console. Examples of action requests include, without limitation, requests to start an application and/or end the application and/or requests to perform a particular action within the application.

While haptic interfaces may be used with virtual-reality systems, as shown in FIG. 49, haptic interfaces may also be used with augmented-reality systems, as shown in FIG. 50. FIG. 50 is a perspective view a user 5010 interacting with an augmented-reality system 5000. In this example, the user 5010 may wear a pair of augmented-reality glasses 5020 that have one or more displays 5022 and that are paired with a haptic device 5030. The haptic device 5030 may be a wristband that includes a plurality of band elements 5032 and a tensioning mechanism 5034 that connects the band elements 5032 to one another.

One or more of the band elements 5032 may include any type or form of actuator suitable for providing haptic feedback. For example, one or more of the band elements 5032 may be configured to provide one or more of various types of cutaneous feedback, including vibration, force, traction, texture, and/or temperature. To provide such feedback, the band elements 5032 may include one or more of various types of actuators. In one example, each of the band elements 5032 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 4810, 4820, 4904, and 5030 may include any suitable number and/or type of haptic transducer, sensor, and/or feedback mechanism. For example, the haptic devices 4810, 4820, 4904, and 5030 may include one or more mechanical transducers, piezoelectric transducers, and/or fluidic transducers. The haptic devices 4810, 4820, 4904, and 5030 may also include various combinations of different types and forms of transducers that work together or independently to enhance a user's artificial-reality experience. In one example, each of the band elements 5032 of the haptic device 5030 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method of fabricating a microfluidic valve, the method comprising:
   forming a cavity within a microfluidic valve body;
   positioning a gate transmission element within the cavity, wherein the gate transmission element separates the cavity into an input gate terminal and an output gate terminal; and
   forming a fluid channel including an inlet port, a restricting region at least partially within the output gate terminal, and an outlet port within the microfluidic valve body, wherein the gate transmission element is positioned and configured to move back and forth upon pressurization and depressurization of the input gate terminal to restrict the restricting region to inhibit the flow of a subject fluid from the inlet port to the outlet port upon pressurization of the input gate terminal and to allow or increase the flow of subject fluid from the inlet port to the outlet port upon depressurization of the input gate terminal.

2. The method of claim 1, wherein positioning the gate transmission element within the cavity comprises positioning a plunger within a subject fluid chamber and coupling the plunger to a flexible membrane; and further comprising: positioning a flexible bubble within the output gate terminal and over the inlet port and the outlet port, the restricting region defined in the fluid channel between the inlet port and outlet port and within the flexible bubble, wherein the plunger is configured to deform the flexible bubble upon pressurization of the input gate terminal to block the restricting region with the deformed flexible bubble to inhibit flow of the subject fluid from the inlet port to the outlet port.

3. The method of claim 2, wherein forming the cavity within the microfluidic valve body comprises forming the cavity to have a cross-sectional area taken parallel to the flexible membrane of about 1 mm$^2$ or less.

4. The method of claim 1, further comprising forming an exhaust outlet in the microfluidic valve body, wherein the exhaust outlet is in fluid communication with the output gate terminal.

5. The method of claim 1, wherein forming the cavity within the microfluidic valve body comprises:
forming the input gate terminal within a drive body portion of the microfluidic valve body; and
forming the output gate terminal within a gate body portion of the microfluidic valve body.

6. The method of claim 5, further comprising forming a flexible membrane on a surface of the gate body portion.

7. The method of claim 5, further comprising:
coupling the drive body portion to the gate body portion; and
coupling a fluid channel body portion to the gate body portion.

8. The method of claim 7, further comprising forming a flexible bubble on a surface of the fluid channel body portion.

9. The method of claim 7, further comprising forming at least one alignment mark on or in at least one of the drive body portion, the gate body portion, or the fluid channel body portion, wherein coupling the drive body portion to the gate body portion and coupling the fluid channel body portion to the gate body portion comprises using the at least one alignment mark to align the drive body portion, gate body portion, and fluid channel body portion to each other.

10. The method of claim 1, wherein forming the cavity within the microfluidic valve body comprises performing at least one photolithography operation.

11. The method of claim 1, wherein forming the cavity within the microfluidic valve body comprises forming the cavity within at least one of:
a silicon material;
a silicon dioxide material;
a glass material;
a polycarbonate material; or
a rigid polymer material.

* * * * *

UNITED STATES PATENT AND TRADEMARK OFFICE
CERTIFICATE OF CORRECTION

PATENT NO. : 11,084,031 B1
APPLICATION NO. : 16/279152
DATED : August 10, 2021
INVENTOR(S) : Sean Jason Keller et al.

Page 1 of 1

It is certified that error appears in the above-identified patent and that said Letters Patent is hereby corrected as shown below:

On the Title Page

Item [72] delete "Mengue," and insert -- Menguc, --, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*